(12) United States Patent
Winkenbach et al.

(10) Patent No.: US 7,218,330 B1
(45) Date of Patent: May 15, 2007

(54) METHOD AND SYSTEM FOR SELECTING ELEMENTS IN A GRAPHICAL USER INTERFACE

(75) Inventors: Georges A. Winkenbach, Seattle, WA (US); Iain Clifford Heath, Bellevue, WA (US); Scott M. LeGendre, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 10/337,654

(22) Filed: Jan. 7, 2003

(51) Int. Cl.
*G09G 5/00* (2006.01)
*G06T 11/20* (2006.01)

(52) U.S. Cl. ...................... 345/620; 345/442

(58) Field of Classification Search ................ 345/620, 345/621, 442
See application file for complete search history.

(56) References Cited

U.S. PATENT DOCUMENTS

| | | | | |
|---|---|---|---|---|
| 5,307,454 A * | 4/1994 | Shin | ........................... | 345/628 |
| 5,784,061 A * | 7/1998 | Moran et al. | ................ | 715/863 |
| 5,805,170 A * | 9/1998 | Burch | ........................ | 345/619 |
| 6,100,902 A * | 8/2000 | Horikawa et al. | .......... | 345/441 |
| 6,480,207 B1 * | 11/2002 | Bates et al. | .................. | 715/800 |
| 6,483,509 B1 * | 11/2002 | Rabenhorst | .................. | 345/442 |
| 6,850,249 B1 * | 2/2005 | Gu | ............................. | 345/623 |
| 7,006,085 B1 * | 2/2006 | Acosta et al. | ............... | 345/419 |
| 7,042,463 B2 * | 5/2006 | Kitsutaka | ..................... | 345/592 |
| 2003/0001835 A1 * | 1/2003 | Dimsdale et al. | ........... | 345/419 |
| 2003/0214536 A1 * | 11/2003 | Jarrett et al. | ................. | 345/831 |
| 2005/0162428 A1 * | 7/2005 | Stamm et al. | .............. | 345/467 |

OTHER PUBLICATIONS

"Pen-based interaction techniques for organizing material on an electronic whiteboard", Moran et al., ACM 1997, p. 45-54.*

* cited by examiner

*Primary Examiner*—Ryan Yang
(74) *Attorney, Agent, or Firm*—Perkins Coie LLP

(57) ABSTRACT

A computer-implemented method and system for selecting elements in a graphical user interface (GUI) is presented. The method and system improves upon existing approaches by simplifying an element selection perimeter created in a document within a GUI. Preliminary selections and rejections of elements that are located inside or outside of an element selection perimeter, respectively, are also performed. The simplification of the element selection perimeter and the preliminary selections and rejections of elements provide element selections in a GUI quickly, using a minimized number and complexity of computations.

44 Claims, 15 Drawing Sheets

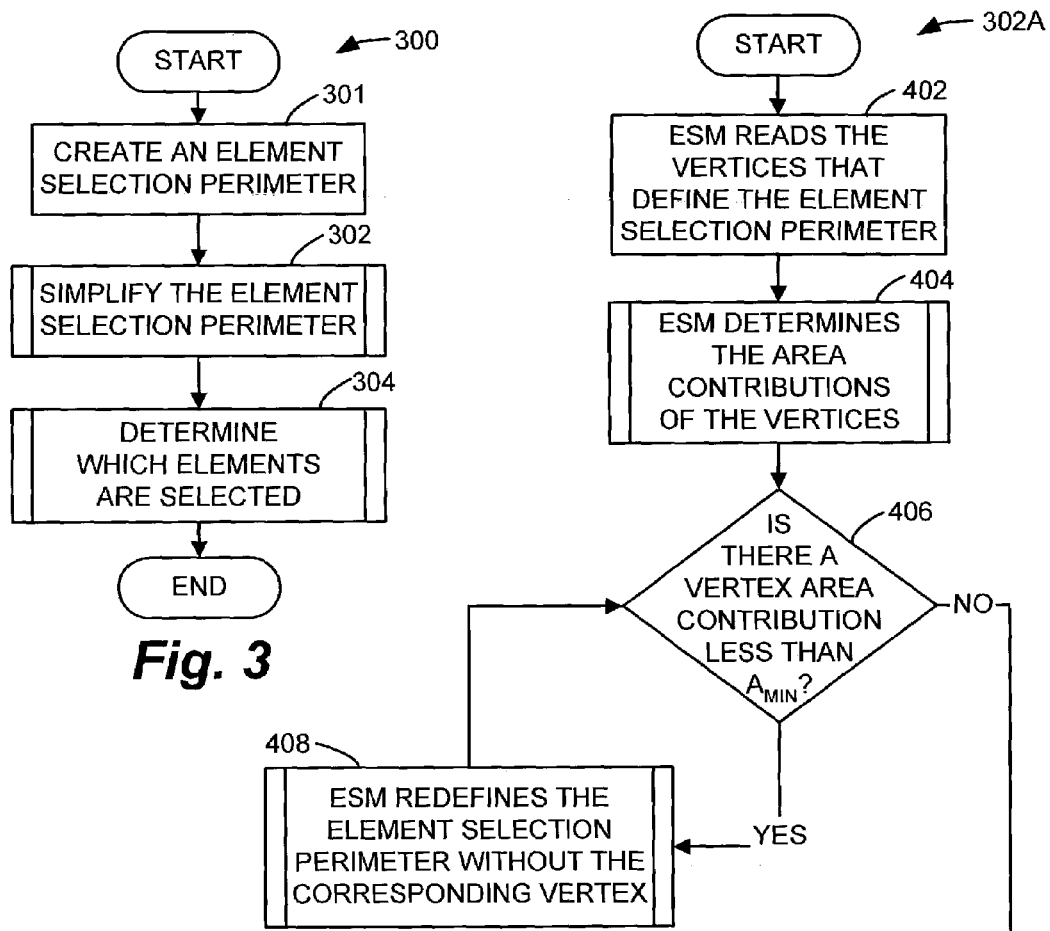
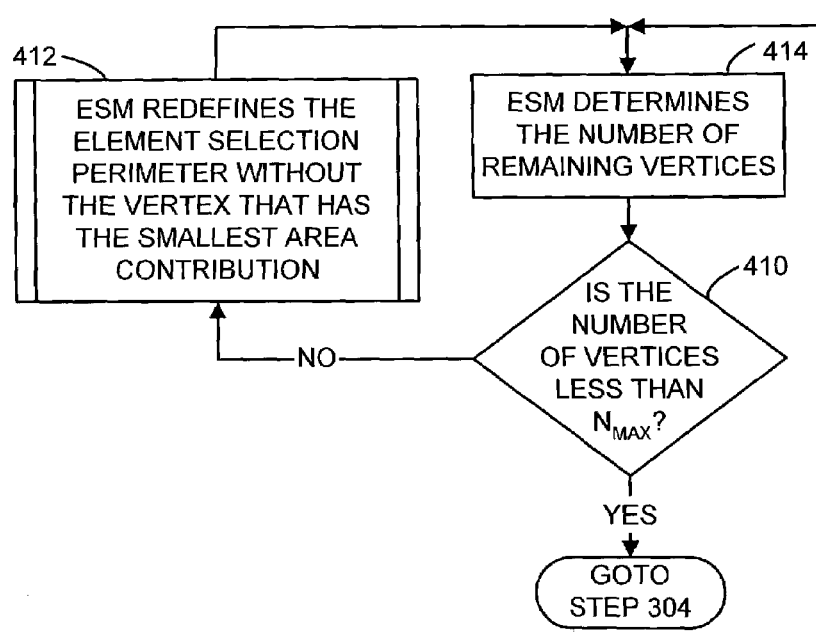
Fig. 3
Fig. 4A

METHOD AND SYSTEM FOR SELECTING ELEMENTS IN A GRAPHICAL USER INTERFACE

TECHNICAL FIELD

The present invention is generally directed to a software module used for element selection. More specifically, the present invention provides a method and system for selecting elements of a document in a graphical user interface.

BACKGROUND OF THE INVENTION

Element selection in a graphical user interface (GUI) environment on a computer system, such as a GUI of Microsoft Visio or another application program, is an essential action to facilitate creating and modifying a diagram, figure, or other type of document. Typically, a document displayed in a GUI includes one or more elements, such as shapes, letters, numbers, or symbols. These elements may need to be selected to perform editing functions in the GUI environment, such as moving, sizing, or changing the color of the elements, for example.

An element selection perimeter (which is also known as a "lasso") provides the capability to select one or more elements in a document by enclosing the elements within a closed curve (i.e., a perimeter) that can be produced by various methods. One popular method of producing an element selection perimeter is the use of an element selection tool, which is also known as a "lasso tool." An element selection tool can produce an element selection perimeter in response to a user's input actions made with a computer system input device, such as a mouse or digitizer pen. Typically, an element selection perimeter that is produced using an element selection tool is defined by points (also referred to as vertices) that are generated by the input device and correspond to the movement of the element selection tool in a GUI. These points are connected in sequence by line segments to produce an element selection perimeter. Thus, an element selection perimeter can offer a user the convenient capability of selecting multiple elements at the same time instead of having to select each element individually.

The process of element selection in a GUI with an element selection perimeter should occur quickly and efficiently to provide useful performance. However, existing approaches to the process of element selection in a GUI typically provide slow element selection performance. Furthermore, the existing approaches typically require a significant amount of processing by a computer system processor to execute the process, which can degrade the overall performance of the computer system, such as the capability to execute other processes.

The slow and processor-intensive performance of existing approaches to element selection processes can be attributed to various inefficient features. For example, existing approaches typically define an element selection perimeter using every point that is made by an element selection tool or other method of producing an element selection perimeter. Since these points are typically closely spaced, the resulting element selection perimeter is typically defined by many points, which typically causes element selection to be a slow and processor-intensive process. As another example, existing approaches typically determine which elements to select by testing each element in a document to determine if it is contained within the element selection perimeter. Thus, elements may be analyzed that are not even close to the interior of the element selection perimeter or that should not be selected because they are in a hidden or locked mode. This is also typically a slow and processor-intensive process.

In view of the foregoing, there is a need in the art for a method and system for selecting elements in a graphical user interface that provides fast and processor efficient performance. Specifically, a need exists to be able to define an element selection perimeter using a minimal number of points (or vertices). A further need exists to be able to determine which elements have been selected by only testing the elements that are at least partially contained within the element selection perimeter.

SUMMARY OF THE INVENTION

The present invention is generally directed to providing element selection in a graphical user interface (GUI) quickly, with minimal processor computations, using an element selection perimeter or "lasso." The present invention overcomes shortcomings of existing approaches to element selection, which typically involve a slow, computation-intensive process of checking each element for containment within an element selection perimeter. Specifically, the present invention simplifies an element selection perimeter that is produced by one of various methods, such as an element selection tool (or "lasso tool"), to facilitate fast element selection computations. The present invention also performs preliminary selections and rejections of elements that are located inside or outside of an element selection perimeter, respectively, to reduce the number of element selection computations.

In one aspect, the invention comprises a computer-implemented method for element selection in a GUI. The method includes creating an element selection perimeter, simplifying the element selection perimeter, and determining which elements are selected. An element selection module (ESM) can simplify the element selection perimeter by reading the vertices that define the perimeter and determining the area contribution of each vertex. The ESM can redefine the element selection perimeter without the corresponding vertex for each vertex area contribution that the ESM determines is less than a predetermined area value. The ESM can then compare the number of remaining vertices to a predetermined vertex quantity value to determine whether to further simplify the element selection perimeter. If further simplification is needed, the ESM can redefine the element selection perimeter without the vertex that has the smallest contribution area until the ESM determines that the number of remaining vertices is less than the predetermined vertex quantity value.

In another aspect, the ESM can determine initial element selections by rejecting unselectable (e.g., hidden or locked) elements from selection consideration, defining a bounding box around the element selection perimeter and each element, and rejecting from consideration for selection each element with a bounding box that is entirely outside the bounding box of the element selection perimeter. If the selection mode is full containment, the ESM can reject each element from consideration for selection that has a bounding box that is not entirely inside of the bounding box of the element selection perimeter. If any elements remain that have a bounding box that is at least partially within the bounding box of the element selection perimeter, the ESM can reject from consideration for selection each element with a bounding box that is entirely outside of the actual element selection perimeter. Further, the ESM can select each element with a bounding box that is entirely inside of the element selection perimeter. If any elements remain that are at least partially within the element selection perimeter, the ESM can select such elements, depending on the selection mode. If the selection mode is full containment, the ESM can select each element that is entirely contained within the element selection perimeter. If the selection mode is partial containment, the ESM can select each element that is at least partially contained within the element selection perimeter.

In another aspect, the invention comprises a computer system for element selection in a GUI that includes a processing unit, a memory, a display device for displaying document elements, an input device for selecting document elements, and a program stored in the memory for providing instructions to the processing unit. The processing unit is responsive to the instructions of the program for the purpose of simplifying an element selection perimeter, and determining which elements are selected. Simplifying an element selection perimeter and determining which elements are selected according to the instructions can include the same details as described above.

The invention further provides a computer-readable medium that has an element selection routine stored on it. The element selection routine includes logic for simplifying an element selection perimeter and logic for determining which elements are selected. Simplifying an element selection perimeter and determining which elements are selected according to the logic can include the same details as described above.

These and other aspects of the invention will be described in the detailed description in connection with the drawing set and claim set.

BRIEF DESCRIPTION OF THE DRAWINGS

FIG. 3 is a logic flow diagram illustrating an overview of an exemplary process for selecting elements in a graphical user interface according to an exemplary embodiment of the present invention.

FIG. 4A is a logic flow diagram illustrating an exemplary process of the logic flow diagram illustrated in FIG. 3 for simplifying an element selection perimeter according to an exemplary embodiment of the present invention.

DETAILED DESCRIPTION OF THE EXEMPLARY EMBODIMENTS

Figure 1:
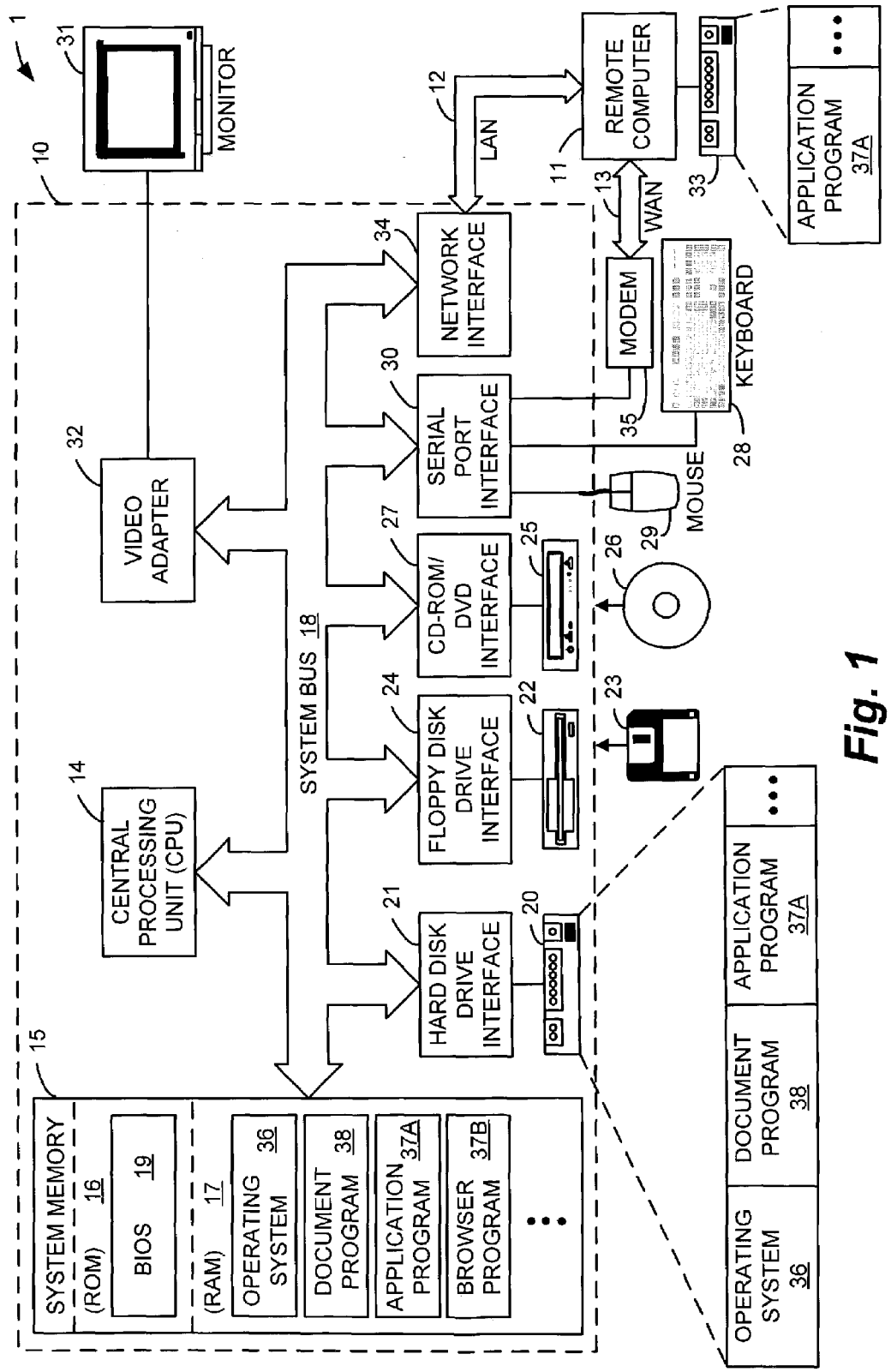
FIG. 1 is a block diagram illustrating an exemplary operating environment for implementation of various embodiments of the present invention.

The present invention enables the selection of elements in a graphical user interface (GUI) quickly, with minimal processor computations, using an element selection perimeter or "lasso." Specifically, the present invention simplifies an element selection perimeter by reducing the number of points that define the perimeter to facilitate fast element selection computations. Conventional approaches to element selection typically define an element selection perimeter using every point that is made by an element selection tool or other method of producing an element selection perimeter, which causes element selection to have increased complexity and computation requirements. In contrast, the present invention facilitates simple, fast element selection computations by minimizing the number of points defining an element selection perimeter. Conventional approaches to element selection also typically test each element in a document to determine if it is contained within an element selection perimeter, which typically requires a large amount of unnecessary computations. In contrast, the present invention performs preliminary selections and rejections of elements that are located inside or outside of an element selection perimeter, respectively, thereby reducing the number of element selection computations needed to determine element selections. The effects of the simplification of an element selection perimeter and the preliminary selections and rejections of elements with respect to the element selection perimeter, in accordance with the present invention, are to provide element selection in a GUI that is fast and requires a minimized amount of computations.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended flow charts (or logic flow diagrams). However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the present invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 is a block diagram illustrating an exemplary operating environment 1 for implementation of various embodiments of the present invention. Those skilled in the art will appreciate that FIG. 1 and the associated discussion are intended to provide a brief, general description of one exemplary embodiment of computer hardware and program modules, and that additional information is readily available in appropriate programming manuals, user's guides, and similar publications.

The exemplary operating environment 1 illustrated in FIG. 1 includes a general-purpose computing device that can be in the form of a conventional personal computer 10. As shown in FIG. 1, the personal computer 10 operates in a networked environment with logical connections to a remote server 11. The logical connections between the personal computer 10 and the remote server 11 are represented by a local area network 12 and a wide area network 13. Those of ordinary skill in the art will recognize that in this client/server configuration, the remote server 11 may function as a file server or computer server.

The personal computer 10 includes a processing unit 14, such as a "PENTIUM" microprocessor manufactured by Intel Corporation of Santa Clara, Calif. The personal computer also includes system memory 15, including read only memory (ROM) 16 and random access memory (RAM) 17, which is connected to the processor 14 by a system bus 18. An exemplary embodiment of the computer 10 utilizes a basic input/output system (BIOS) 19, which is stored in the ROM 16. Those skilled in the art will recognize that the BIOS 19 is a set of basic routines that helps to transfer information between elements of the personal computer 10. Those skilled in the art will also appreciate that the present invention may be implemented on computers having other architectures, such as computers that do not use a BIOS 19, and those that utilize other types of microprocessors for a processing unit 14.

Within the personal computer 10, a local hard disk drive 20 is connected to the system bus 18 via a hard disk drive interface 21. A floppy disk drive 22, which is used to read or write to a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27.

A user can enter commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, digitizer pens, head trackers, data gloves, and other devices suitable for positioning a cursor on a monitor 31. The monitor 31 or other kind of display device is connected to the system bus 18 via a video adapter 32.

As depicted in FIG. 1, a number of program modules can be stored on ROM 16, RAM 17, hard disk 21, floppy disk 23, or CD-ROM/DVD disk 26, such as an operating system 36, an application program module 37*a*, a browser program module 37*b*, and a document program 38. Program modules include routines, sub-routines, programs, objects, components, data structures, etc., which perform particular tasks or implement particular abstract data types. Aspects of the present invention can be implemented in a document program 38 to select elements of a document in a GUI.

The remote server 11 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules, such as an application program module 37*a*, are provided to the remote server 11 via computer-readable media. The personal computer 10 is connected to the remote server 11 by a network interface 34, which is used to communicate over a local area network (LAN) 12.

In some embodiments, the personal computer 10 is also connected to the remote server 11 by a modem 35, which is used to communicate over a wide area network (WAN) 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 10, thus communicating directly via the system bus 18. It is important to note that connection to the remote server 11 via both the LAN 12 and the WAN 13 is not required, but merely illustrates alternative methods of providing a communication path between the personal computer 10 and the remote server 11.

Those skilled in the art will appreciate that program modules, such as the operating system 36, the application program module 37*a*, the browser program module 37*b*, and the document program 38 can be provided to the personal computer 10 via computer-readable media. In exemplary embodiments of the operating environment 1, the computer-readable media can include the local or remote memory storage devices, which may include the local hard disk drive 20, floppy disk 23, CD-ROM/DVD 26, RAM 17, ROM 16, and the remote memory storage device 33. In some exemplary embodiments of the personal computer 10, the local hard disk drive 20 is used to store data and programs.

Although other elements of the personal computer 10 and the operating environment 1 in general are not shown, those of ordinary skill in the art will appreciate that such components and the interconnection between them are known. Accordingly, additional details concerning the elements of the personal computer 10 and the operating environment 1 in general need not be disclosed in connection with the present invention for it to be implemented by those of ordinary skill in the art.

Figure 2:
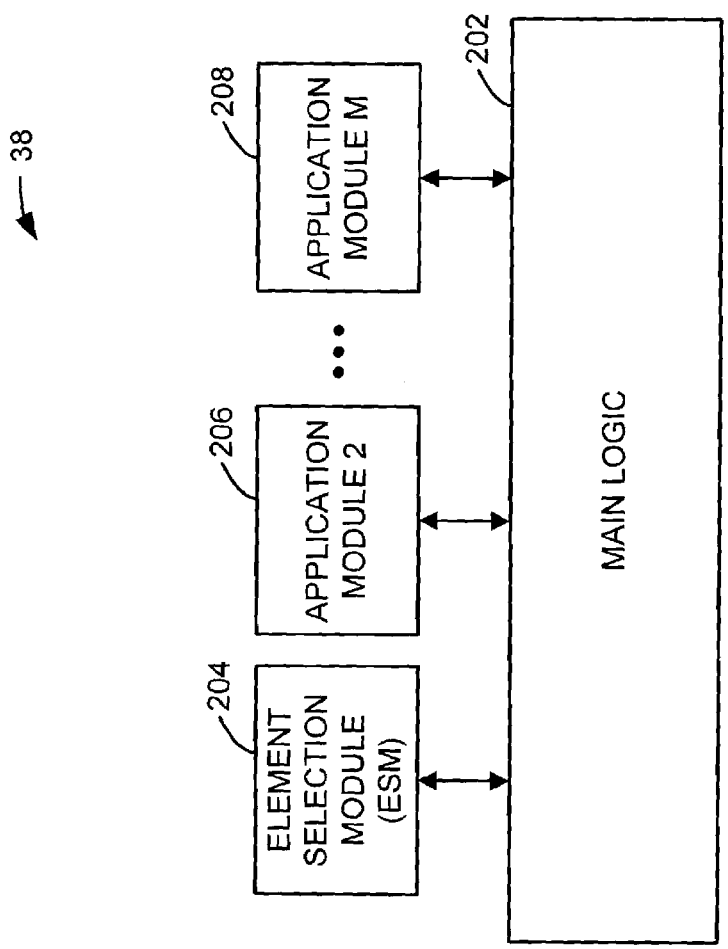
FIG. 2 is a block diagram illustrating an exemplary architecture of the document program illustrated in the block diagram of FIG. 1 according to an exemplary embodiment of the present invention.

Referring now to FIG. 2, a block diagram is shown that illustrates an exemplary architecture of the document program 38 illustrated in the block diagram of FIG. 1 according to an exemplary embodiment of the present invention. The exemplary document program architecture 38 includes a main logic 202, which embodies main routines and functions of the document program 38. The architecture 38 also includes various application modules, such as an element selection module 204 and other application modules 206, 208. These application modules typically provide additional routines and functions to the main logic 202 of the document program 38. The element selection module (ESM) 204 can be configured to implement aspects of the present invention for the purpose of selecting elements in a document of the document program 38 in a GUI. In this regard, functions of the ESM 204 as they relate to aspects of the present invention will be described in detail below.

In the following discussion references will be made to elements of the document program 38, including the ESM 204, and the exemplary operating environment 1, as applicable, to facilitate the description of aspects and embodiments of the present invention. In that regard, reference is now made to FIG. 3, which is a logic flow diagram that illustrates an overview of an exemplary process 300 for selecting elements in a graphical user interface according to an exemplary embodiment of the present invention. In the first step 301 of the exemplary process 300, an element selection perimeter, also known as a "lasso," can be created. In accordance with the present invention, the element selection perimeter is typically made in a GUI around one or more elements of a document of a document program 38. Briefly referring to FIG. 11 for exemplary purposes, an element selection perimeter 1102 is depicted surrounding several elements. Other examples of an element selection perimeter will be discussed subsequently below.

There are various possible methods to create an element selection perimeter in step 301. For example, the element selection perimeter may be created using an element selection tool, also known as a "lasso tool," which can produce an element selection perimeter in a document in response to a user's input actions made with a computer system input device, such as a mouse 29 or digitizer pen. As another example, an element selection perimeter may be created in step 301 by a routine of the main logic 202 of the document program 38, the ESM 204, or other application modules 206, 208, such as an edge detection routine that creates an element selection perimeter based on the edge parameters of an element in a document. Within the scope of the present invention, other methods may be used to create an element selection perimeter 204 which may be known in the art. Throughout the subsequent discussion of the present invention, references may be made interchangeably to the various methods for creating an element selection perimeter, such as those described in the foregoing discussion.

Following step 301, the process 300 continues with step 302. In step 302 the element selection perimeter created in step 301 can be simplified, typically by functions of the ESM 204. In the simplification step 302, the ESM 204 reduces or minimizes the number of points (or vertices) that define an element selection perimeter to facilitate fast element selection computations. Exemplary processes for the simplification of the element selection perimeter in accordance with step 302 will be described further below.

The process 300 concludes with step 304 after step 302. In step 304, a determination is made of which elements have been selected. This step 304 is also typically carried out by functions of the ESM 204. In step 304, preliminary selections and rejections are made of elements that are located inside or outside of an element selection perimeter, respectively, in order to reduce the amount and complexity of element selection computations needed to determine the element selections. Further, in step 304, the elements that are selected by use of the element selection perimeter are actually determined. Exemplary processes for the determination of the element selection in accordance with step 304 will be described further below.

It is noted that step 302 of the process 300 may be executed by the ESM 204 substantially contemporaneous to the creation of the element selection perimeter in step 301. Thus, for example, the ESM 204 may simplify one or more sections of the element selection perimeter prior to the complete element selection perimeter being produced in a document. This substantially contemporaneous execution of steps 301 and 302 facilitates faster overall execution of the process 300 of element selection.

Turning now to FIG. 4A, a logic flow diagram is shown that illustrates an exemplary process 302A for the simplification of the element selection perimeter in accordance with step 302 of FIG. 3. The exemplary process 302A begins with step 402 in which the ESM 204 reads the vertices (i.e., the points) that define an element selection perimeter. As is known in the art, an element selection perimeter is typically defined by vertices (or points) that are connected sequentially by line segments. For example, briefly referring to FIG. 12, a section 1200 of an element selection perimeter is shown that includes vertices 1201–1205 that are sequentially connected by line segments 1207–1210 These vertices may, for example, be produced by a mouse 29 in conjunction with an element selection tool that is used to produce an element selection perimeter. In step 402, the ESM 204 can collect information on these vertices, such as their location and sequence, to use in subsequent steps of the process 302A.

Step 404 follows step 402 in the process 302A. In step 404, the ESM 204 determines the area contributions of the vertices, which will be referred to as the vertex area contributions. Typically, the ESM 204 determines the vertex area contributions based on an area defined by connecting three or more vertices of the element selection perimeter. For example, referring again briefly to FIG. 12, the vertices 1202–1204 are connected to define a vertex contribution area 1206. The vertex contribution areas that are determined in step 404 can be used in subsequent steps of the process 302A. An exemplary process for determining the vertex contribution areas in accordance with step 404 will be described in more detail below.

After step 404, the process 302A proceeds to decision step 406. In step 406, the ESM 204 determines whether any of the vertex area contributions that were determined in step 404 are less than a predetermined area value, $A_{min}$. This predetermined area value may be based on any of a number of factors, including empirical calculations, algorithmic calculations, and/or a user's preferences. Preferably, the value of $A_{min}$ facilitates an optimal minimization, in subsequent steps of the process 302A, of the number of vertices that define the element selection perimeter. The determination made in step 406 can be made by various methods which may known in the art, such as a relational comparison of each vertex contribution area value to the predetermined area value, $A_{min}$. Moreover, the vertex area contribution that is analyzed in step 406 may be based on one or more factors such as the sequence of the corresponding vertex or the relative value of the vertex area contribution, among others.

Figure 12:
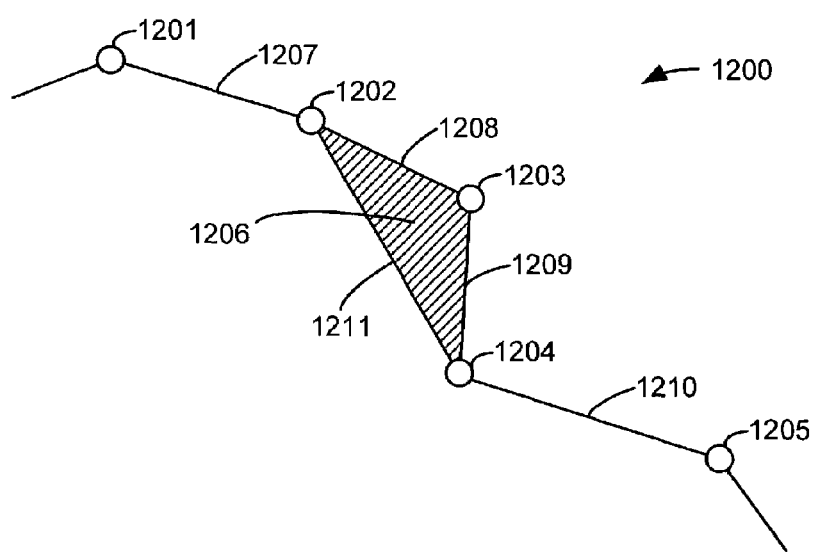
FIG. 12 illustrates an exemplary section of the element selection perimeter illustrated in FIG. 11 that includes vertices and an exemplary vertex contribution area according to an exemplary embodiment of the present invention.

If it is determined in decision step 406 that there is a vertex area contribution that is less than $A_{min}$, the process 302A proceeds along the "yes" branch to step 408. In step 408, the ESM 204 redefines the element selection perimeter without the corresponding vertex of the vertex contribution area that was determined to be less than $A_{min}$ in step 406. Referring briefly to FIG. 12 for exemplary purposes, vertex 1203 can be the corresponding vertex of vertex area contribution 1206. The rationale for eliminating the corresponding vertex in this step 408 is that its contribution to the overall shape of the element selection perimeter is negligible when considering the computational benefits gained by reducing the number of vertices that define the element selection perimeter. More specifically, the subsequent computations required to determine the elements that are selected are reduced in complexity, which facilitates faster computations, by reducing the number of vertices that define the element selection perimeter. Thus, a beneficial trade-off of increased speed of the element selection computations for reduced accuracy of the intended shape of the element selection perimeter is made by eliminating the corresponding vertex in step 408. An exemplary process for redefining the element selection perimeter without the corresponding vertex in accordance with step 408 will be described in more detail below.

After the ESM 204 redefines the element selection perimeter in step 408, the process 302A proceeds back to decision step 406 and the ESM 204 again determines whether any of the remaining vertex area contributions are less than $A_{min}$. This determination by the ESM 204 can include consideration of any new vertex contribution areas that exist as the result of the redefinition of the element selection perimeter by the ESM 204 in step 408. Thus, for example, the ESM 204 may calculate the new vertex contribution areas that result from the elimination of the corresponding vertex in step 408, prior to repeating the determination in step 406.

If it is determined in decision step 406 that there is not a vertex area contribution that is less than $A_{min}$, the process 302A proceeds along the "no" branch to step 414. In step 414, the ESM 204 determines the number of remaining vertices that define the element selection perimeter. The ESM 204 can make the determination of step 414 by various methods which may be known in the art. Moreover, the ESM 204 may utilize data gathered in previous steps of the process 302A in order to determine the number of remaining vertices in step 414.

After step 414, the process 302A proceeds to decision step 410. In step 410, the ESM 204 determines whether the number of remaining vertices that define the element selection perimeter, which was determined in step 414, is less than a predetermined vertex quantity value, $N_{max}$. Similar to $A_{min}$, described above, the predetermined vertex quantity value $N_{max}$ may be based on any of a number of factors, including empirical calculations, algorithmic calculations, and/or a user's preferences. The value of $N_{max}$ preferably facilitates optimally fast element selection computations in subsequent steps of the process 302A, due to the reduced number of vertices that define the element selection perimeter. The determination made in step 410 by the ESM 204 can be done by various methods which may known in the art, such as a relational comparison of the number of remaining vertices that define the element selection perimeter to the predetermined vertex quantity value, $N_{max}$.

If the ESM 204 determines in step 410 that the number of remaining vertices that define the element selection perimeter is not less than $N_{max}$, the process 302A proceeds along the "no" branch to step 412. In step 412, the ESM 204 redefines the element selection perimeter without the vertex that corresponds to the smallest vertex area contribution. For example, referring to FIG. 12, the ESM can redefine the element selection perimeter between vertex 1202 and vertex 1204 along line segment 1211 without the corresponding vertex 1203. Similar to the rationale for step 408, step 412 provides a beneficial trade-off of increased speed of the element selection computations for reduced accuracy of the intended shape of the element selection perimeter by eliminating a corresponding vertex. An exemplary process for redefining the element selection perimeter without the corresponding vertex in accordance with step 412 will be described in more detail below.

After the ESM 204 redefines the element selection perimeter in step 412, the process 302A proceeds back to step 414 and the ESM 204 again determines the number of remaining vertices that define the element selection perimeter. The process 302A then proceeds again to step 410- and the ESM 204 determines whether the revised number of remaining vertices is less than $N_{max}$. The progression of step 414, step 410, and step 412 can repeat until the number vertices that define the element selection perimeter becomes less than $N_{max}$.

If the ESM 204 determines in step 410 that the number of remaining vertices that define the element selection perimeter is less than $N_{max}$, the process 302A proceeds along the "yes" branch and terminates by proceeding to step 304 of FIG. 3, in which the element selection is determined. It should be noted that the steps 402–414 of the process 302A may be executed by the ESM 204 substantially contemporaneous to the creation of the element selection perimeter in step 302 of the process 300 (FIG. 3). Thus, for example, the ESM 204 may determine one or more vertex area contributions in step 404 prior to the completion of the creation of the element selection perimeter. As another example, the ESM 204 may determine that a vertex contribution area is less than $A_{min}$ and then redefine the element selection perimeter without the corresponding vertex, in accordance with steps 406 and 408, prior to the completion of the creation of the element selection perimeter. This substantially contemporaneous execution of the steps 402–414 with step 302 facilitates faster overall execution of the process 300 of element selection.

Figure 4B:
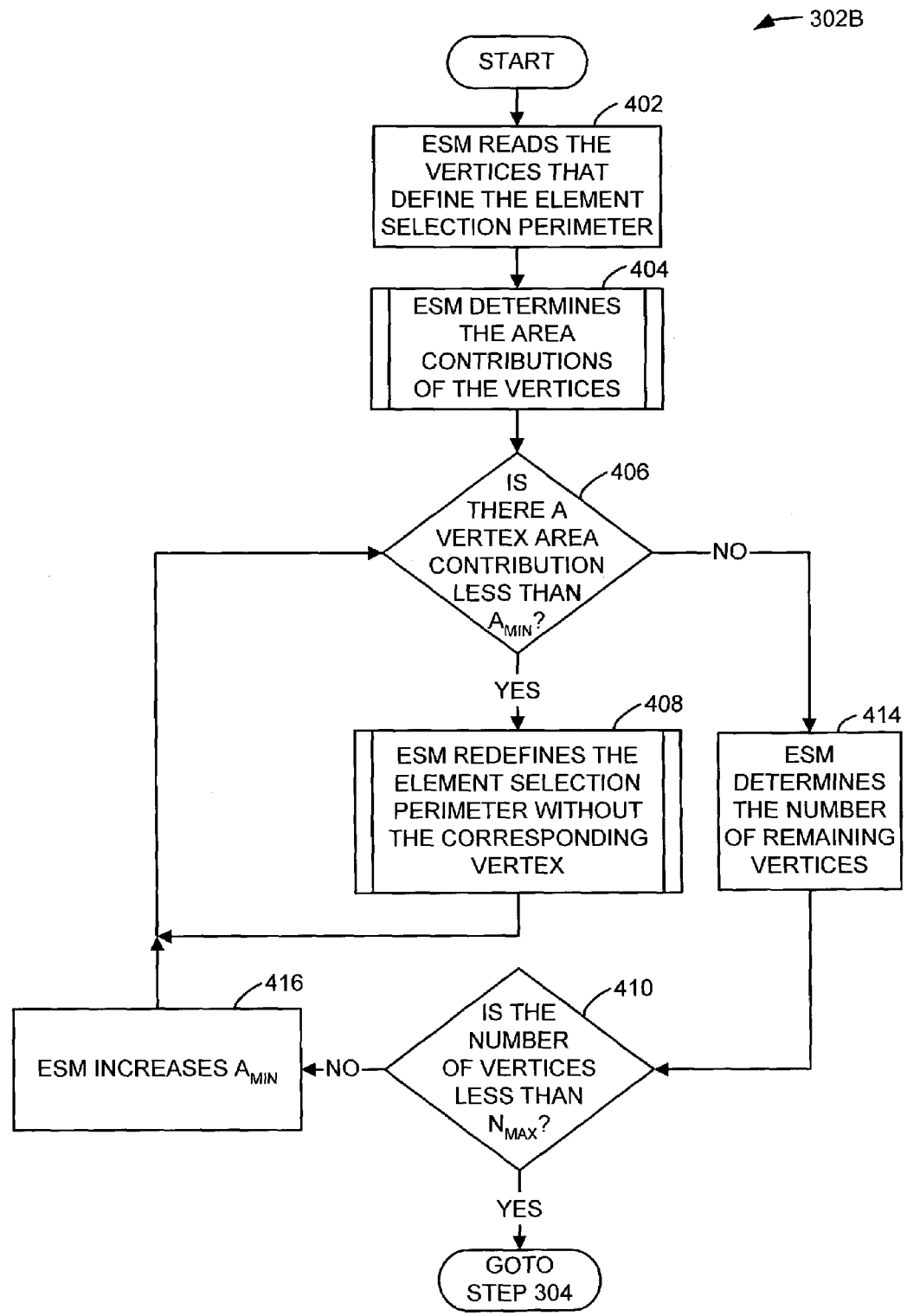
FIG. 4B is a logic flow diagram illustrating an alternative exemplary process of the logic flow diagram illustrated in FIG. 3 for simplifying an element selection perimeter according to an exemplary embodiment of the present invention.

FIG. 4B is a logic flow diagram illustrating an alternative exemplary process 302B for the simplification of the element selection perimeter in accordance with step 302 of FIG. 3. Most of the steps 402–416 for the process 302B are the same or substantially similar to the steps 402–414 for the process 302A (FIG. 4A) that were described above, although the progression of some of the steps are different. Therefore, some steps of the process 304B will only be described briefly below with reference made to the more detailed descriptions that were made above with respect to the process 302A of FIG. 4A. In that regard, the process 302B begins with step 402 in which the ESM 204 reads the vertices that define an element selection perimeter. As described in further detail above with respect to FIG. 4A, the ESM 204 can collect information on these vertices in step 402 to use in subsequent steps of the process 302B.

The process 302B proceeds from step 402 to step 404 in which the ESM 204 determines the vertex area contributions, as described in further detail above for FIG. 4A, for subsequent use in the process 302B. An exemplary process in accordance with step 404 will be described in more detail below. Decision step 406 follows step 404 in the process 302B. As described in further detail above with respect to FIG. 4A, the ESM 204 determines whether any of the vertex area contributions that were determined in step 404 are less than the predetermined area value, $A_{min}$, in step 406. As also further described above, the value of $A_{min}$ may be based on various factors to facilitate the optimal minimization of the number of vertices that define the element selection perimeter.

If it is determined in decision step 406 that there is a vertex area contribution that is less than $A_{min}$, the process 302A proceeds along the "yes" branch to step 408. In step 408, the ESM 204 redefines the element selection perimeter without the corresponding vertex of the vertex contribution area that was determined to be less than $A_{min}$ in step 406. The trade-off rationale for step 408 here is the same as described above with respect to the process 302A of FIG. 4A. Furthermore, an exemplary process in accordance with step 408 will be described in more detail below.

After step 408, in which the ESM 204 redefines the element selection perimeter, the process 302A proceeds back to decision step 406 and the ESM 204 again determines whether any of the remaining vertex area contributions are less than $A_{min}$. As discussed in more detail above with respect to FIG. 4A, this determination by the ESM 204 may include consideration of any new vertex contribution areas that result from the redefinition in step 408.

If it is determined in decision step 406 that there is not a vertex area contribution that is less than $A_{min}$, the process 302B proceeds along the "no" branch to step 414. In step 414, the ESM 204 determines the number of remaining vertices that define the element selection perimeter, as discussed in more detail above for FIG. 4A. The process 302B proceeds to decision step 410 after step 414. In step 410, the ESM 204 determines whether the number of remaining vertices that define the element selection perimeter is less than the predetermined vertex quantity value, $N_{max}$. Details of how step 410 may be executed, as well the details of how $N_{max}$ may be determined, were described above with respect to FIG. 4A.

In contrast to the process 302A described above for FIG. 4A, if the ESM 204 determines in step 410 of the process 302B that the number of remaining vertices is not less than $N_{max}$, the process 302A proceeds along the "no" branch to step 416. In step 416, the ESM 204 increases the value of $A_{min}$. The value that $A_{min}$ is increased to in step 416 may be based on factors such as empirical calculations, algorithmic calculations, and/or a user's preferences, among others. Moreover, the ESM 204 may increase the value of $A_{min}$ in step 416 based on one or more predetermined increment values. Such increments may have different values and may be applied dependent on other factors, such as the present value of $A_{min}$ or the number of times $A_{min}$ has been previously increased, for example. Preferably, $A_{min}$ is increased in step 416 just enough to facilitate sufficient simplification of the element selection perimeter through the further elimination of vertices.

The process 302B proceeds from step 416 back to decision step 406 in which the ESM 204 determines whether any of the remaining vertex area contributions are less than the new value of $A_{min}$. If the ESM 204 determines that there is a vertex area contribution less than $A_{min}$, the process 302B proceeds along the "yes" branch to step 408 as just described above. The progression of step 406 to step 408 can repeat until the ESM 204 determines that there is not a vertex area contribution remaining that is less than $A_{min}$, in which case the process 302B will proceed again along the "no" branch to step 414, as just described above. From step 414, the process will proceed again to decision step 410.

If the ESM 204 again determines in step 410 that the number of remaining vertices is not less than $N_{max}$, the process 302B will proceed again along the "no" branch to FIG. 416, as just described above. Thus, the progression of steps 406, 410, and 416 and of steps 406 and 408 may repeat until the ESM 204 determines in step 410 that the number of vertices is less than $N_{max}$, in which case the process will proceed along the "yes" branch from step 410 and terminate by proceeding to step 304 of FIG. 3. As discussed in more detail above with regard to FIG. 4A, the steps 402–416 of the process 302B may be executed by the ESM 204 substantially contemporaneous to the creation of the element selection perimeter in step 302 of the process 300 (FIG. 3).

Figure 5:
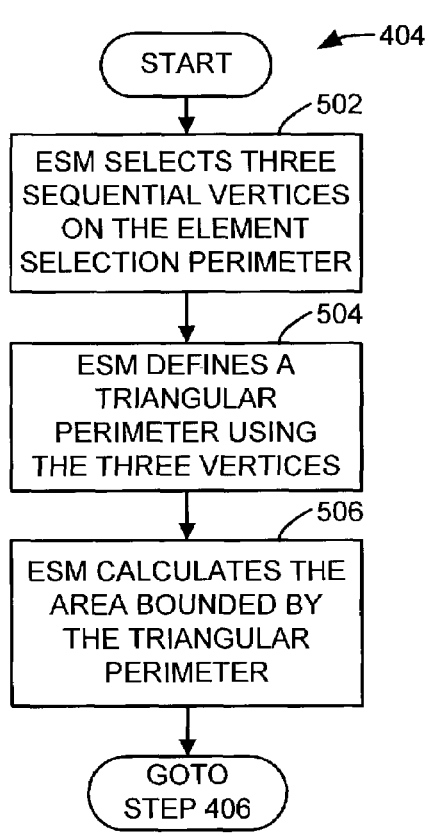
FIG. 5 is a logic flow diagram illustrating an exemplary process of the logic flow diagrams illustrated in FIGS. 4A and 4B for determining the area contributions of the vertices according to an exemplary embodiment of the present invention.

Focusing now on FIG. 5, a logic flow diagram is shown that illustrates an exemplary process 404 for determining the area contributions of the vertices in accordance with step 404 of FIGS. 4A and 4B. The exemplary process 404 begins with step 502 in which the ESM 204 selects three sequential vertices on the element selection perimeter that was created in step 301 (FIG. 3). As discussed above, the sequence information of the vertices may be collected during step 402 of processes 302A and 302B. After step 502, the ESM 204 defines a triangular perimeter using the three vertices selected in step 502. For example, the ESM 204 can define a triangular perimeter by connecting the three vertices together by line segments, as discussed above by the exemplary reference to FIG. 12.

In step 506, which follows step 504, the ESM 204 calculates the area that is bounded by the triangular perimeter defined in step 504. This area corresponds to the vertex area contribution for the second vertex in the sequence of three vertices selected in step 502. The steps 502–506 of the process 404 can be repeated as needed to determine the vertex contribution area of each vertex that defines the element selection perimeter. Moreover, the steps 502–506 can be executed by the ESM 204 using various methods which may be known in the art. After step 506, the process 404 terminates by proceeding to step 406 of FIG. 4A or 4B.

Figure 6A:
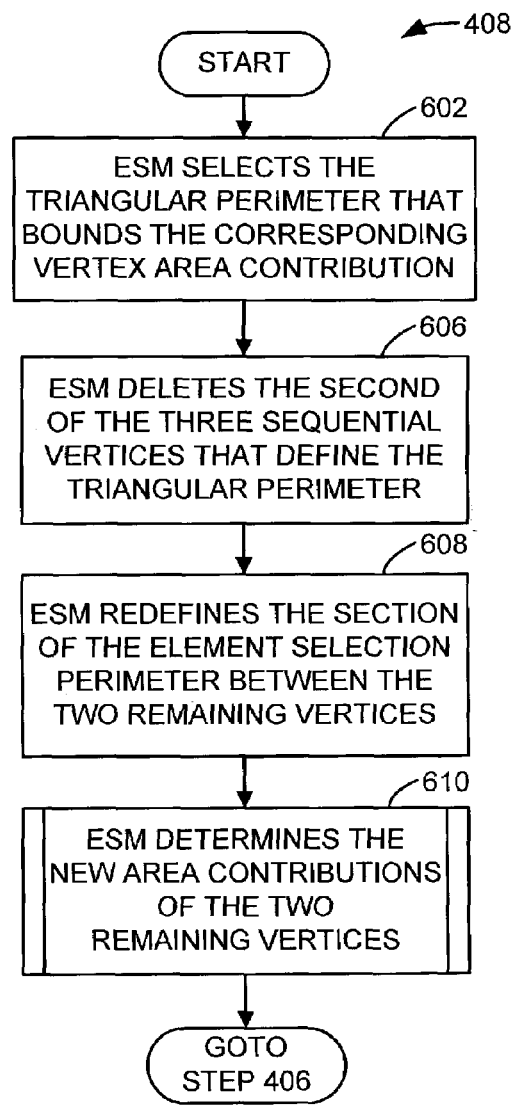
FIG. 6A is a logic flow diagram illustrating an exemplary process of the logic flow diagrams illustrated in FIGS. 4A and 4B for redefining the element selection perimeter without the corresponding vertex according to an exemplary embodiment of the present invention.

FIG. 6A is a logic flow diagram illustrating an exemplary process 408 of redefining the element selection perimeter in accordance with step 408 of FIGS. 4A and 4B. The process 408 begins at step 602 in which the ESM 204 selects the triangular perimeter that bounds the corresponding vertex area contribution that is less than $A_{min}$. As discussed above, the triangular perimeter is defined in step 504 of process 404 (FIG. 5) and the corresponding vertex area contribution is determined in step 404 of process 302A or 302B (FIG. 4A or 4B). The process 408 proceeds from step 602 to step 606 in which the ESM 204 deletes the second vertex of the sequence of three vertices that define the triangular perimeter selected in step 602. As discussed above, the sequence information of the vertices may be collected during step 402 of process 302A or 302B.

After step 606, the ESM 204 redefines the section of the element selection perimeter between the two remaining vertices of the triangular perimeter. For example, the line segments that connected to the second vertex (deleted in step 606) to define the element selection perimeter can be deleted and the element selection perimeter can be redefined by connecting a line segment between the two remaining vertices. An example of such redefinition of the element selection perimeter was briefly described above with respect to FIG. 12. In step 610, after step 608, the ESM 204 determines the new area contributions of the two remaining vertices. This step 610 is performed so that the vertex area contributions of the two remaining vertices can be updated, since these vertex area contributions previously depended on the corresponding vertex that was deleted in step 606. Moreover, one or both of the updated vertex area contributions may be less than $A_{min}$, based on a subsequent determination in step 406. Thus, performing step 610 further facilitates the simplification of the element selection perimeter. Step 610, as well as the other steps 602–608 of the process 408, may be performed by various methods which may be known in the art. An exemplary process for determining the new vertex area contributions of the remaining vertices will be described in more detail below. After step 610, the process 408 terminates by proceeding to step 406 of FIG. 4A or 4B.

Figures 6B, 6C:
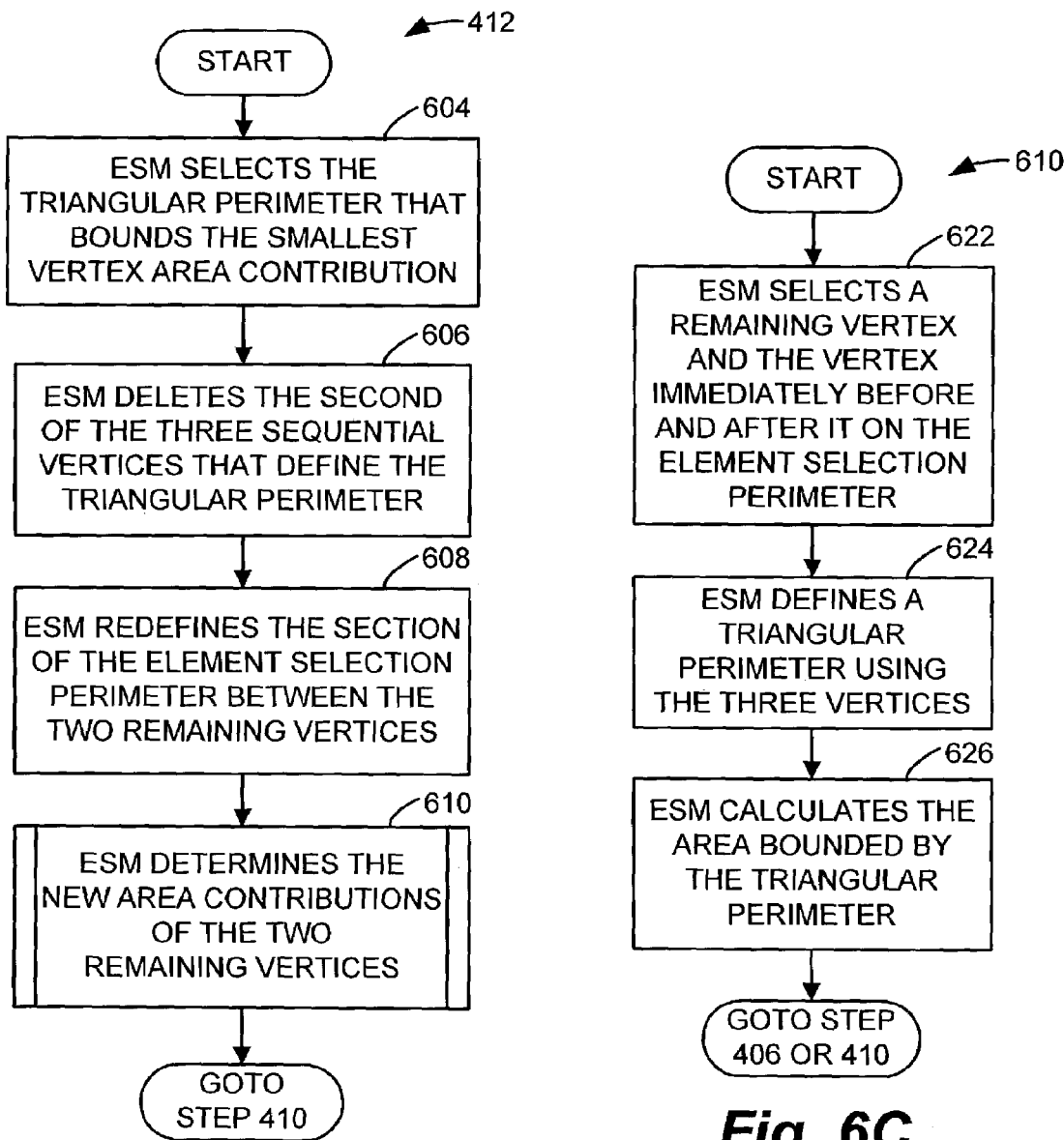
FIG. 6B is a logic flow diagram illustrating an exemplary process of the logic flow diagram illustrated in FIG. 4A for redefining the element selection perimeter without the vertex that has the smallest area contribution according to an exemplary embodiment of the present invention.
FIG. 6C is a logic flow diagram illustrating an exemplary process of the logic flow diagrams illustrated in FIGS. 6A and 6B for determining the new area contributions of the remaining vertices according to an exemplary embodiment of the present invention.

Turning now to FIG. 6B, a logic flow diagram is shown that illustrates an exemplary process 412 for determining the area contributions of the vertices in accordance with step 412 of FIG. 4A. Most of the steps 604–610 for the process 412 are the same or substantially similar to the steps 602–610 for process 408 (FIG. 6A) just described above. Therefore, some steps of the process 412 will only be described briefly in the following with reference made to the more detailed descriptions that were made above with respect to the process 408 of FIG. 6A. The process 412 is executed to further simplify the element selection perimeter, as discussed above in connection with FIG. 4A. More specifically, step 412 is executed to eliminate additional vertices as needed, after all of the corresponding vertices with vertex area contribution less than $A_{min}$ have been eliminated, in order to reduce the number of vertices defining the element selection perimeter to less than $N_{max}$.

In contrast to the process 408 (FIG. 6A), the process 412 begins with step 604 in which the ESM 204 selects the triangular perimeter that bounds the smallest vertex contribution area. The ESM 204 can determine the smallest vertex contribution area as part of this step 604. As discussed above, the corresponding vertex area contribution is determined in step 404 of process 302A (FIG. 4A). In step 606, which follows step 604, the ESM 204 deletes the second vertex of the sequence of three vertices that define the triangular perimeter selected in step 604. As discussed above with respect to FIG. 6A, the sequence information for step 606 may be collected during step 402 of process 302A.

The process 412 proceeds from step 606 to step 608. As discussed in further detail above for FIG. 6A, the ESM 204 redefines the section of the element selection perimeter between the two remaining vertices of the triangular perimeter in step 608. Following step 608, the ESM 204 determines the new area contributions of the two remaining vertices in step 610. This step 610 is also described in further detail above with respect to FIG. 6A. The step 610, as well as the other steps 604–608 of the process 412, may be performed by various methods which may be known in the art. Moreover, an exemplary process for step 610 will be described in more detail below. After step 610, the process 412 terminates by proceeding to step 410 of FIG. 4A.

In FIG. 6C, a logic flow diagram is shown that illustrates an exemplary process 610 for determining the new vertex area contributions of the remaining vertices in accordance with steps 610 of FIGS. 6A and 6B. The process 610 starts at step 622. In step 622, the ESM 204 selects a remaining vertex and also selects the vertex in sequence immediately before and after the remaining vertex on the element selection perimeter. Thus, the ESM 204 selects three vertices in sequence on the element selection perimeter with the remaining vertex corresponding to the second vertex in the sequence. After step 622, the ESM 204 defines a triangular perimeter using the three vertices in step 624. This step 624 is the same or substantially similar in detail to step 504, which was described above with respect to FIG. 5.

The process 610 proceeds to step 626 after step 624. In step 626, the ESM 204 calculates the area bounded by the triangular perimeter, and this step 626 is the same or substantially similar in detail to step 506 that was described above with respect to FIG. 5. After step 626, the process 610 terminates by proceeding to step 406 of FIG. 4A or 4B or to step 410 of FIG. 4A. The steps 622–626 of the process 610 may be performed by various methods known in the art.

Figure 7:
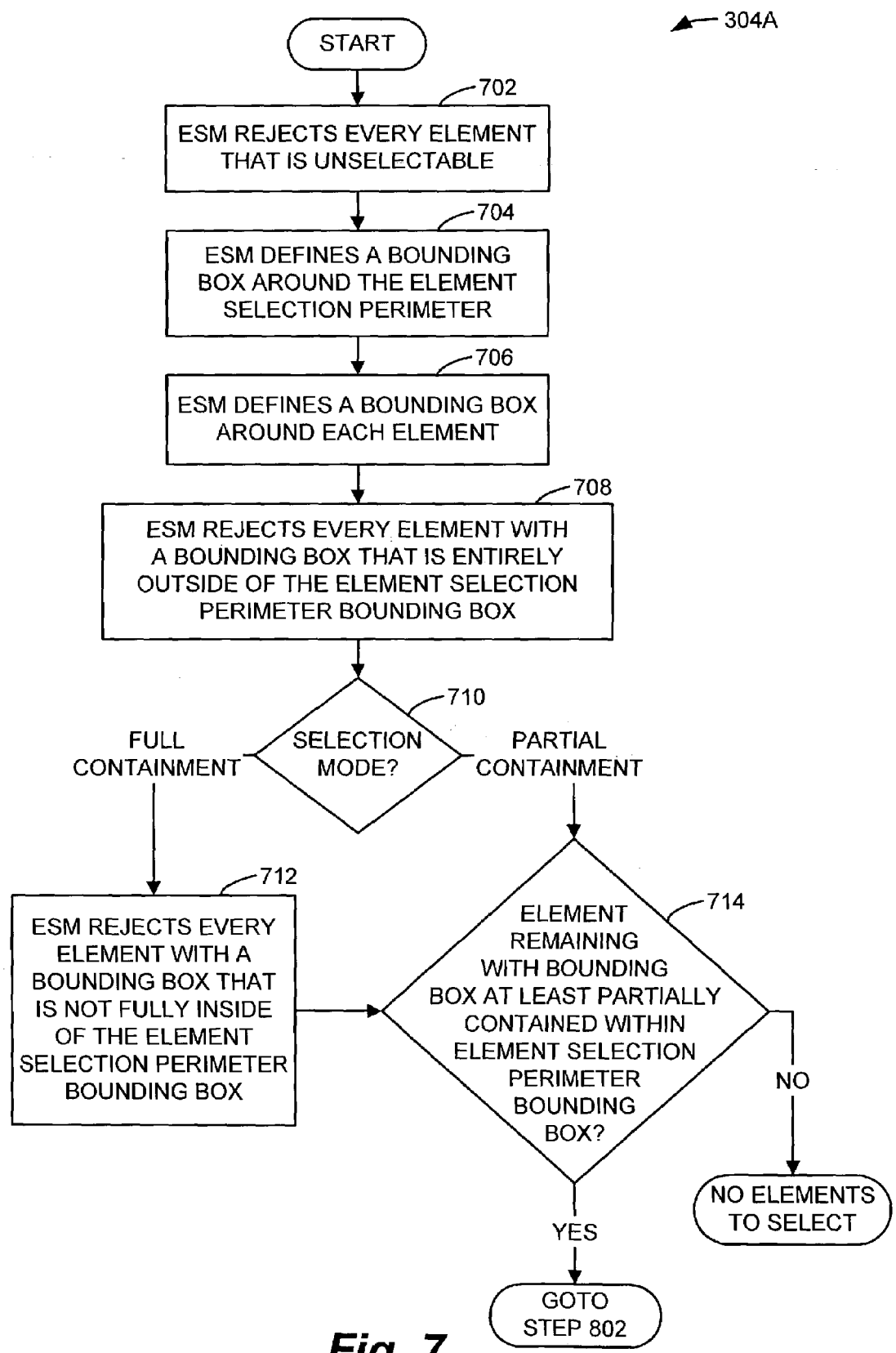
FIG. 7 is a logic flow diagram illustrating an exemplary process of the logic flow diagram illustrated in FIG. 3 for determining which elements are selected according to an exemplary embodiment of the present invention.

Discussion is now focused on FIG. 7, which shows a logic flow diagram that illustrates an exemplary process 304A for determining which elements are selected in accordance with step 304 of FIG. 3. The process 304A starts with step 702 in which the ESM 204 rejects every element in a document that is unselectable. More specifically, the ESM 204 removes unselectable elements from subsequent consideration to be selected. Elements that are rejected in this and subsequent steps of the process 304A will not be tested to determine if they are within the element selection perimeter. Essentially, these elements are eliminated before the main element selection computations, in which the positions of elements with respect to the element selection perimeter are directly determined. As a result, the amount and complexity of computations needed to determine which elements are selected is reduced and the speed of the computations is increased. An element is unselectable, for example, if it is in a locked mode or located on a hidden layer of the document. Elements that are unselectable typically cannot be edited, therefore it would be a waste of computation capability to consider such elements for selection. Elements that are unselectable will be rejected from consideration for selection in step 702 even if they are located within the element selection perimeter.

Following step 702, the process 304A proceeds to step 704 in which the ESM 204 defines a bounding box around the element selection perimeter. Typically the bounding box will be axis aligned and tightly bound. That is, the line segments that define the bounding box are aligned with the horizontal (or x) axis and the vertical (or y) axis of the document to form a rectangular shaped outline around the element selection perimeter. Furthermore, the line segments of the bounding box are also aligned on the outermost edges of the element selection perimeter that correspond with the rectangular outline. Briefly referring to FIG. 13A for exemplary purposes, a bounding box 1103 that is axis aligned and tightly bound is shown defined around an element selection perimeter 1102. Bounding boxes are known in the art.

Step 706 follows step 704 in the process 304A. In step 706, the ESM 204 defines a bounding box around each element in the document. Similar to the bounding box that is defined around the element selection perimeter in step 704, the bounding boxes defined in step 706 are axis aligned and tightly bound. Referring again briefly to FIG. 13A for exemplary purposes, a bounding box 1105 that is axis aligned and tightly bound is shown defined around an element 1104 of a document 1300A.

In step 708, which follows step 706, the ESM 204 rejects every element with a bounding box that is entirely outside of the element selection perimeter bounding box. Since comparison of the position of bounding boxes in a document can typically be conducted with relatively few, simple computations, the ESM 204 rejects such elements from consideration for selection without the need to conduct numerous, more complex computations. Thus, this step 708 further reduces the amount and complexity of computations that are needed to determine the elements that are selected.

Following step 708, the ESM 204 determines the selection mode in decision step 710. In some exemplary embodiments of the present invention, the selection mode can be full containment or partial containment, which refers to the position of the element (and/or the element bounding box) in the document with respect to the interior of the element selection perimeter (and/or the element selection perimeter bounding box). The selection mode may be based one or more factors, such as a setting preference that is input by a user or an internal setting that is based on an algorithmic determination.

If the selection mode is determined to be full containment in step 710, the process 304A proceeds along the "full containment" branch to step 712. In step 712, the ESM 204 rejects from consideration for selection every element with a bounding box that is not fully inside of the element selection perimeter bounding box. Similar to the rejection of elements in step 708, the rejection of elements in step 712 is also conducted by relatively few, simple computations, since the rejection is based on the position of bounding boxes.

If the selection mode is determined to be partial containment in step 710, the process 304A proceeds along the "partial containment" branch to decision step 714. The process 304A also proceeds to decision step 714 from step 712. In step 714, the ESM 204 determines whether there are any unrejected elements remaining in the document with a bounding box that is at least partially contained in the element selection perimeter bounding box. If the determination is that no such elements in the document meet the foregoing criteria, the process 304A proceeds along the "no" branch and terminates with no elements selected in the document, since no elements are even at least partially contained in the element selection perimeter. However, if the determination in step 714 is that one or more such elements in the document meet the determination criteria, the process 304A proceeds along the "yes" branch and terminates by proceeding to step 802, which will be discussed subsequently with respect to FIG. 8. The steps 702–710 of the process 304A may be performed by various methods which may be known in the art.

Figure 8:
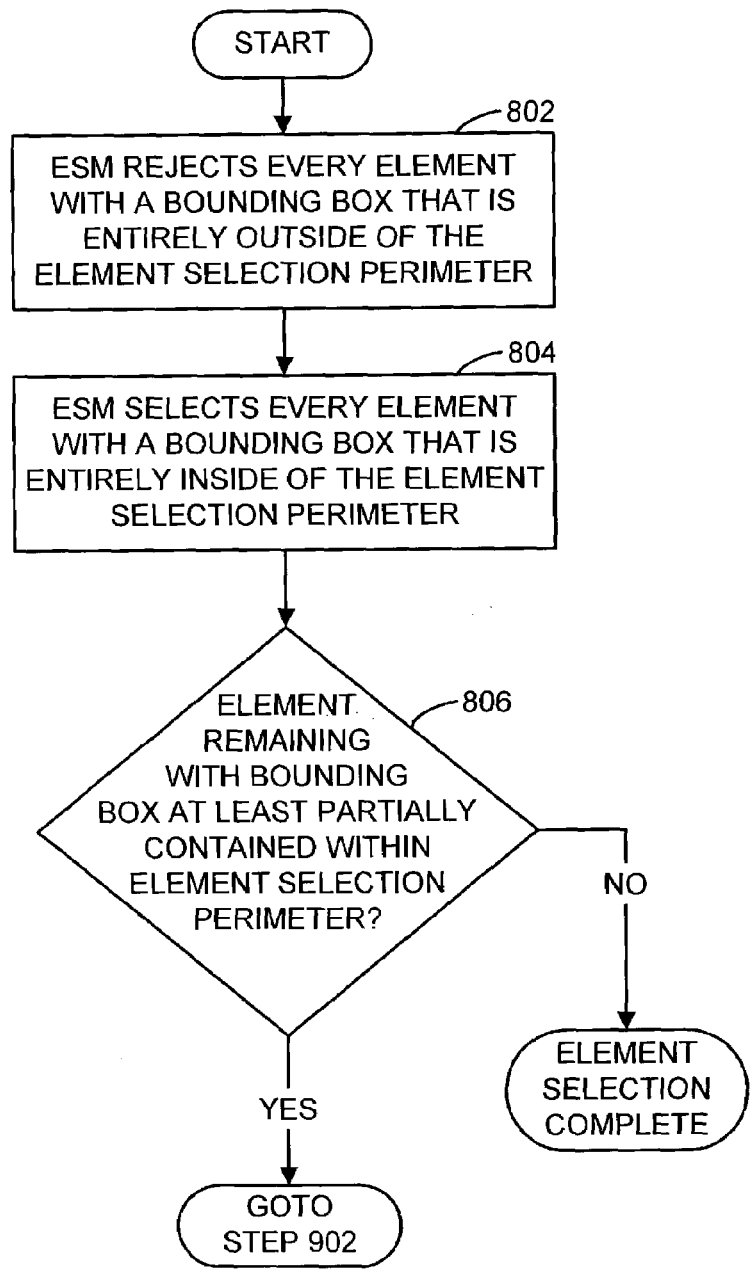
FIG. 8 is a logic flow diagram illustrating an exemplary process of the logic flow diagram illustrated in FIG. 3 for determining which elements are selected according to an exemplary embodiment of the present invention.

FIG. 8 shows a logic flow diagram that illustrates an exemplary process 304B for determining which elements are selected in accordance with step 304 of FIG. 3. Preferably, process 304B is executed in conjunction with process 304A, although process 304B may be independently executed for determining which elements are selected, in some embodiments of the present invention. Process 304B starts with step 802 in which the ESM 204 rejects every element in a document with a bounding box that is entirely outside of the element selection perimeter. Briefly referring to FIG. 14A for exemplary purposes, the pentagon 1112 has a bounding box 1113 that is entirely outside of the element selection perimeter 1102, thus, the shape 1112 would be rejected in step 802. The bounding box of the elements that are referred to with regard to step 802 are axis aligned and tightly bounded, which are characteristics that were described in further detail above for FIG. 7. As also discussed above with regard to FIG. 7, the amount and complexity of computations is reduced and the speed of the element selection process is increased as a result of the element rejections in step 802, which are conducted before the main element selection computations. The computations for the element rejections made in step 802 may be somewhat more complex than the element rejections described above in step 708 (FIG. 7), since the element selection perimeter is considered directly instead of by its bounding box. However the computations for these preliminary rejections are still faster and less complex than the computations for the main element selections without regard for bounding boxes.

Following step 802, the ESM 204 selects every element with a bounding box that is entirely inside of the element selection perimeter in step 804. Referring again briefly to FIG. 14A for exemplary purposes, the star 1106 has a bounding box 1107 that is entirely inside of the element selection perimeter 1102, therefore, the star 1106 would be selected in step 804. The element selection made by the ESM 204 in step 804 are also made preliminary to the main element selection computations. As discussed above, the computations required to determine the position of an element based on its bounding box are less complex than the main element selection computations which consider the position of elements directly, although they may be more complex and slower than computations that use the bounding box of the element selection perimeter as well. The elements that are selected in step 804 are typically positioned entirely inside the element selection perimeter inherently, since the bounding boxes of the elements are entirely inside of the element selection perimeter. Therefore, elements that would be selected by the main element selection computations are selected in step 804 using faster and less complex computations, thereby eliminating the need to consider the elements subsequently during the main element selection computations.

After step 804, the process 304B proceeds to decision step 806 in which the ESM 204 determines whether there are any elements that are both unrejected and unselected remaining in the document with a bounding box that is at least partially contained within the element selection perimeter. If the ESM 204 determines that no such elements in the document meet this criteria, the process 304B proceeds along the "no" branch and terminates with the element selection process being complete, since there are no elements remaining in positions to be considered for selection with respect to the element selection perimeter. However, if the ESM 204 determines that one or more elements in the document that are unrejected and unselected meet the determination criteria for step 806, the process 304B proceeds along the "yes" branch and terminates by proceeding to step 902, which will be discussed subsequently with respect to FIG. 9. The steps 802–806 of the process 304B may be performed by various methods which may be known in the art.

Figure 9:
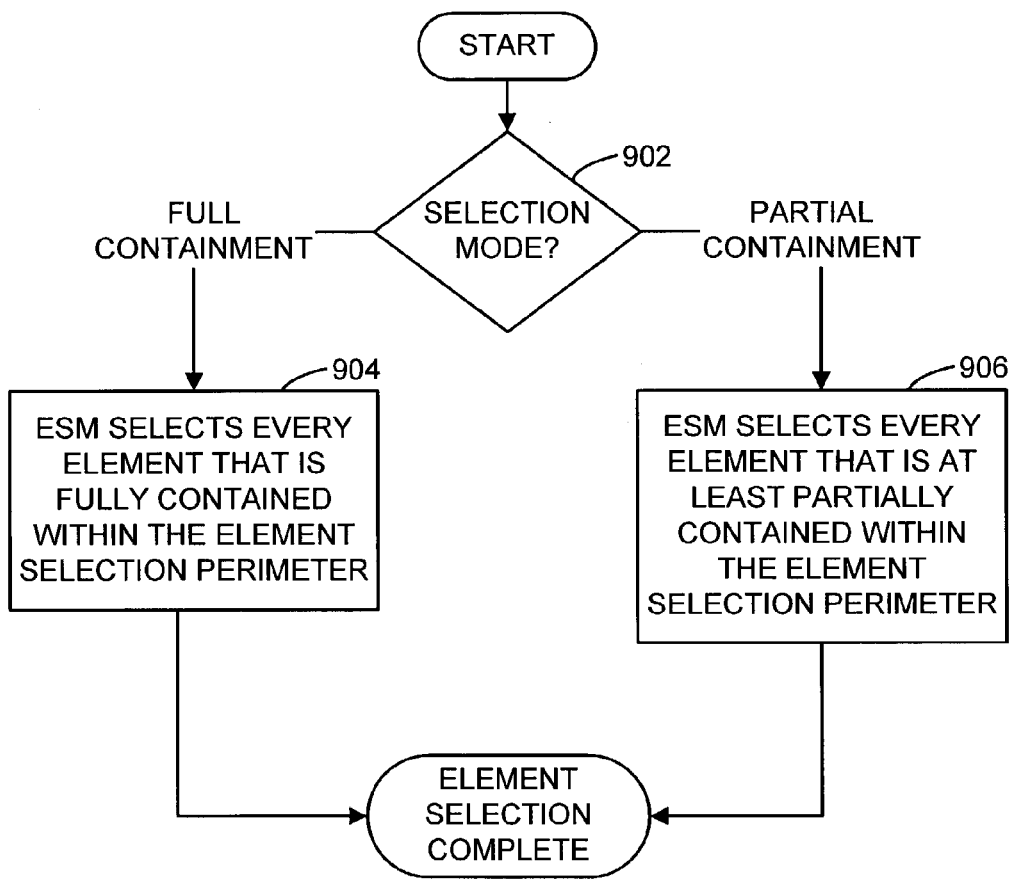
FIG. 9 is a logic flow diagram illustrating an exemplary process of the logic flow diagram illustrated in FIG. 3 for determining which elements are selected according to an exemplary embodiment of the present invention.

FIG. 9 shows a logic flow diagram that illustrates an exemplary process 304C for determining which elements are selected in accordance with step 304 of FIG. 3. Preferably, process 304C is executed in conjunction with process 304A and/or process 304B, although process 304C may be independently executed for determining which elements are selected, in some embodiments of the present invention. Process 304C begins with decision step 902 in which the ESM 204 determines the selection mode. This step is the same or substantially similar to step 710 described above with respect to FIG. 7. Thus, the selection mode can preferably be full containment or partial containment and can be based one or more factors, such as a user's setting preference.

Figure 11:
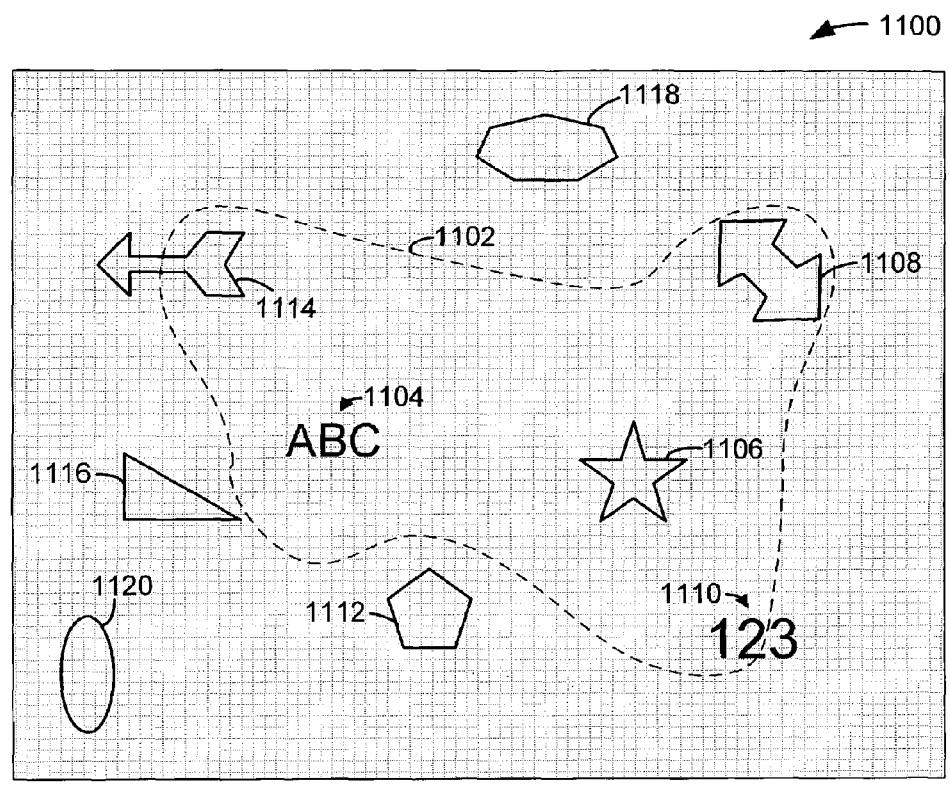
FIG. 11 illustrates an exemplary document with elements that are enclosed in an element selection perimeter according to an exemplary embodiment of the present invention.

If the selection mode is determined to be full containment in step 902, the process 304C proceeds along the "full containment" branch to step 904. In step 904, the ESM 204 selects every element that is fully contained within the element selection perimeter. Referring briefly to FIG. 11 for exemplary purposes, the star 1106 is fully contained within the element selection perimeter 1102. Note that in step 904, the elements and the element selection perimeter are directly considered without regard for bounding boxes. Thus, selections made in this step use more complex and slower computations than those used in the selections and rejections described above for other steps, such as step 708 (FIG. 7) or step 804 (FIG. 8).

If the selection mode is determined to be partial containment in step 902, the process 304C proceeds along the "partial containment" branch to step 906. In step 906, the ESM 204 selects every element that is at least partially contained within the element selection perimeter. Briefly referring again to FIG. 11 for exemplary purposes, the arrow 1114 is at least partially contained within the element selection perimeter 1102. Similar to step 904, direct consideration of the elements and the element selection perimeter is made in step 906 using more complex and slower computations than those used in the selections and rejections described above with respect to previous steps in FIGS. 7 and 8. Following step 904 or step 906, the process 304C terminates with the element selections completed. At this point, the user may edit the selected elements as needed.

As discussed above, the selections made in steps 904 and 906 are exemplary of selections that are made using main element selection computations, since the selections directly consider the positions of the elements with respect to the element selection perimeter without regard to bounding boxes. As also discussed above, the main element selection computations are typically more complex and slower than element selection computations that involve bounding boxes around the elements or around the elements and the element selection perimeter. The steps 902–906 of the process 304C may be performed by various methods which may be known in the art. However, an exemplary preferred process for conducting the main element selection computations in steps 904 and 906 will be discussed below.

In the above discussions with respect to the processes 304A, 304B, and 304C (FIGS. 7, 8, and 9, respectively), it was noted that the processes 304A, 304B, and/or 304C can be executed in conjunction or independently. It should be further understood that the processes 304A, 304B, and/or 304C can be executed on a per document basis, a per element basis, or some other per element grouping basis. For example, if the processes 304A, 304B, and 304C are executed in conjunction on a per document basis, all elements remaining for selection consideration in the document can be processed during each step of the processes 304A, 304B, and 304C—for simplicity, the execution of the processes 304A, 304B, and 304C was described above on this basis. As another example, however, if the processes 304A, 304B, and 304C are executed in conjunction on a per element basis, each element can be processed individually through all of the steps of the processes 304A, 304B, and 304C—thus, the letter phrase 1104 (see for example, FIG. 11) can be processed through all of the steps of the processes 304A, 304B, and 304C, as applicable, before another element of the document 1100 is processed through the steps.

Figure 10A:
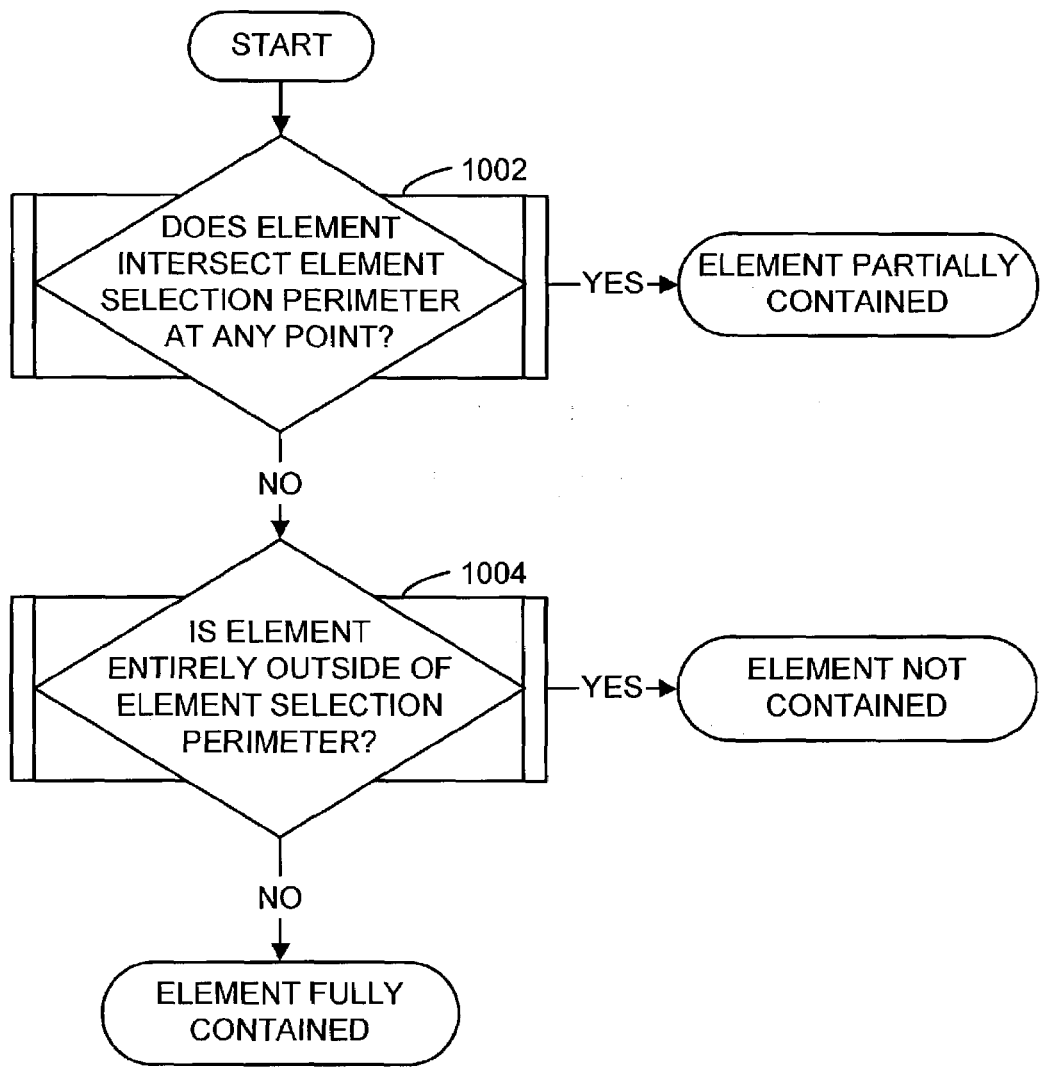
FIG. 10A is a logic flow diagram illustrating an exemplary process for determining the containment status of an element with respect to an element selection perimeter according to an exemplary embodiment of the present invention.

Turning now to FIG. 10A, a logic flow diagram is shown that illustrates an exemplary process 1000 for determining the containment status of an element with respect to an element selection perimeter in accordance with step 904 or step 906 of FIG. 9. The process 1000 begins with decision step 1002, in which the ESM 204 determines if an element intersects the element selection perimeter at any point. Briefly referring to FIG. 11 for exemplary purposes, the number phrase 1110 and the arrow 1114 each intersect the element selection perimeter 1102 at some point on it. This step 1002 involves complex computations which may be known in the art. An exemplary process for making the determination of step 1002 will be described in more detail below.

If, in step 1002, it is determined that an element intersects a point on the element selection perimeter, the process 1002 proceeds along the "yes" branch to a determination that the element is partially contained. The rationale for this determination is that the element must be at least partially contained within the element selection perimeter since it intersects the element selection perimeter at some point. However, if it is determined in step 1002 that the element does not intersect the element selection perimeter, the process 1000 proceeds along the "no" branch to decision step 1004.

In decision step 1004, the ESM 204 determines if an element is entirely outside of the element selection perimeter. Referring again to FIG. 11 for exemplary purposes, the pentagon 1112 and the triangle 1116 are each entirely outside of the element selection perimeter 1102. This step 1004 also involves complex computations which may be known in the art. Furthermore, an exemplary process for making the determination of step 1004 will be described in more detail below.

If it is determined that an element is entirely outside of the element selection perimeter in step 1004, the process 1004 proceeds along the "yes" branch to a determination that the element is not contained within the element selection perimeter. This determination is based on the cumulative reasoning that the element must be outside of the element selection perimeter if it does not intersect the element selection perimeter and is also entirely outside of the element selection perimeter. If it is instead determined in step 1004 that the element is not fully outside of the element selection perimeter, the process 1000 proceeds along the "no" branch to a determination that the element is fully contained within the element selection perimeter. This determination is based on the cumulative reasoning that the element must be completely inside of the element selection perimeter if it does not intersect the element selection perimeter and it is not entirely outside of the element selection perimeter.

The steps 1002, 1004 of the process 1000 can be repeated for each element that is considered for selection. For example, the steps of the process 1000 may be repeated during the execution of step 904 or step 906 (FIG. 9) for each element that is unrejected and unselected. Other processes may be known in the art for conducting main element selection computations, and their use is within the scope of the present invention.

Figure 10B:
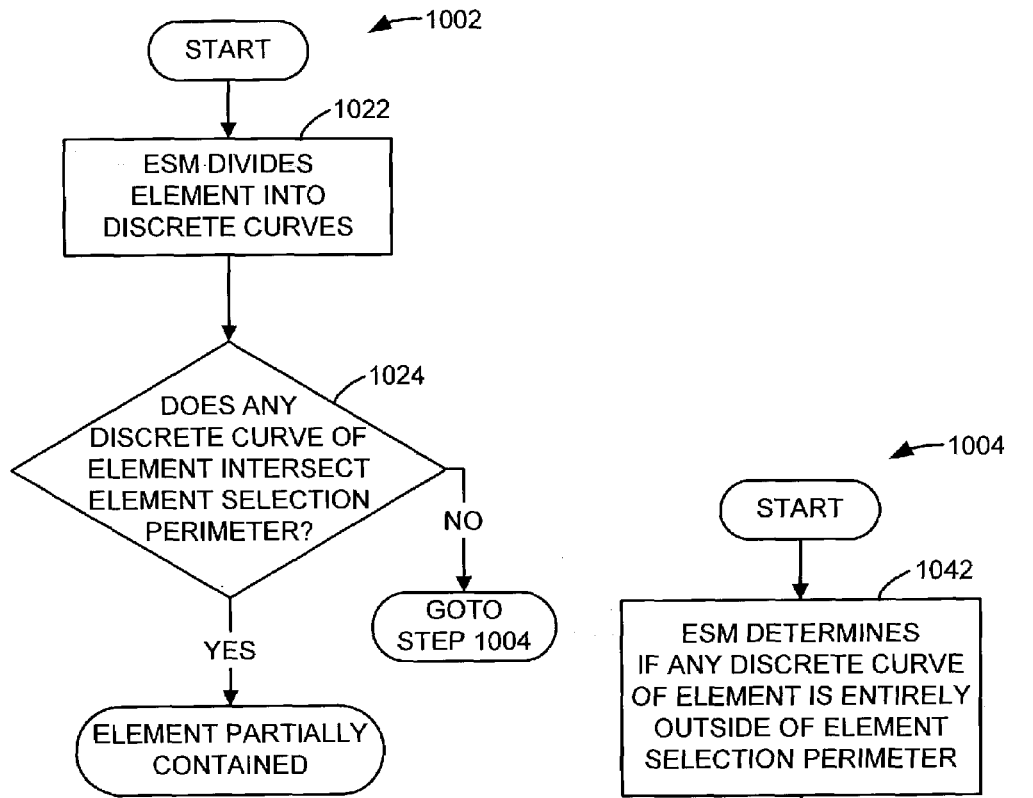
FIG. 10B is a logic flow diagram illustrating an exemplary process of the logic flow diagram illustrated in FIG. 10A for determining if an element intersects an element selection perimeter according to an exemplary embodiment of the present invention.

FIG. 10B shows a logic flow diagram that illustrates an exemplary process 1002 for determining if an element intersects the element selection perimeter in accordance with step 1002 of FIG. 10A. The process 1002 starts with step 1022 in which the ESM 204 divides the element into discrete curves. Typically, any element in a document can be defined by a combination of discrete open or closed curves. The process 1002 proceeds from step 1022 to decision step 1024 in which the ESM 204 determines if any discrete curve of the element intersects the element selection perimeter. Typically, an element selection perimeter can be defined as a polygon, which might be self-intersecting. In step 1024, the ESM 204 determines if any of the discrete curves that define the element intersects the polygon that defines the element selection perimeter.

If it is determined in step 1024 that any discrete curve of the element intersects the element selection perimeter, the process 1002 proceeds along the "yes" branch to a determination that the element is partially contained within the element selection perimeter. The reasoning for this determination was discussed above with respect to FIG. 10A. However, if it is determined that no discrete curve of the element intersects the element selection perimeter, the process 1002 proceeds along the "no" branch to proceed to step 1004 of the process 1000 (FIG. 10A) to further determine the element section. The steps 1022, 1024 of the process 1002 may be performed by various methods which may be known in the art.

Figure 10C:
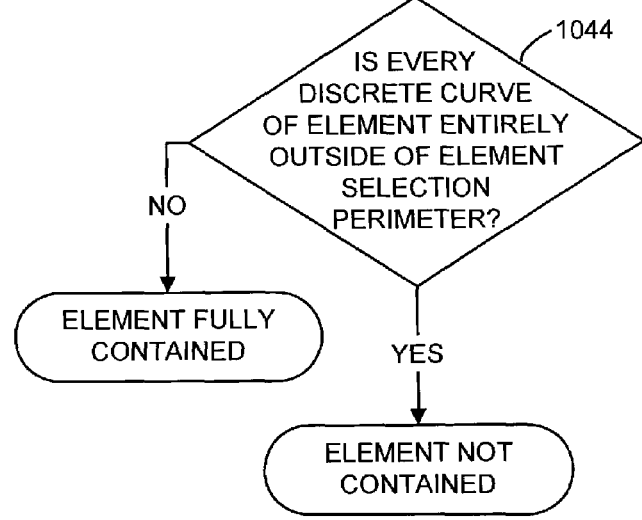
FIG. 10C is a logic flow diagram illustrating an exemplary process of the logic flow diagram illustrated in FIG. 10A for determining if an element is entirely outside of an element selection perimeter according to an exemplary embodiment of the present invention.

FIG. 10C shows a logic flow diagram that illustrates an exemplary process 1004 for determining if an element is entirely outside of the element selection perimeter, in accordance with step 1004 of FIG. 10A. The process 1004 starts with step 1042 in which the ESM 204 determines if any discrete curve of the element is entirely outside of the element selection perimeter. Typically, the ESM 204 has previously divided the element into discrete curves, for example in step 1022 of the process 1002. The process 1004 proceeds from step 1042 to determination step 1044, in which the ESM 204 determines if every discrete curve of the element is outside of the element selection perimeter.

If it is determined in step 1044 that every discrete curve of the element is outside of the element selection perimeter, the process 1004 proceeds along the "yes" branch to a determination that the element is not contained within the element selection perimeter. However, if it is determined that every discrete curve of the element is not outside of the element selection perimeter, the process 1004 proceeds along the "no" branch to a determination that the element is not contained within the element selection perimeter. The reasoning for these determinations was discussed above with respect to FIG. 10A. The steps 1042, 1044 of the process 1004 may be performed by various methods which may be known in the art.

Having discussed several processes above related to the aspects and features of the present invention, discussion will now be focused on several exemplary diagrams related to the implementation of the foregoing processes. Turning to FIG. 11, a diagram is shown that illustrates an exemplary document 1100 with elements that are enclosed in an element selection perimeter according to an exemplary embodiment of the present invention. The exemplary document 1100 includes an element selection perimeter 1102 that has been drawn around several elements of the document 1100. As discussed above, for example with respect to step 301 of FIG. 3, the element selection perimeter 1102 can be created by various methods, such as by a user's inputs using an element selection tool.

The document 1100 includes various elements. For example, the document 1100 includes a letter phrase 1104 and a number phrase 1110. As another example, the document 1100 includes a star 1106, a pentagon 1112, and an arrow 1114. As shown in FIG. 11, the document 1100 also includes various other elements. These elements are basic examples of the numerous types, styles, and shapes of elements that may be included in a typical document 1100. Moreover, a typical document 1100 may be created by one of many various types of document programs 38. For example, a document 1100 may be created by a computerassisted drawing (CAD) program, a word-processing program, or a spreadsheet program.

FIG. 12 shows a diagram that illustrates an exemplary section 1200 of the element selection perimeter 1100 illustrated in FIG. 11 that includes vertices and an exemplary vertex contribution area. The exemplary section 1200 includes several sequential vertices 1201–1205. As discussed above, for example with respect to process 302A of FIG. 4A, the element selection perimeter can be defined by the vertices 1201–1205, which are produced when the element selection perimeter is created. As also discussed above, the element selection perimeter 1100 can be further defined by connecting the vertices in sequence by line segments. In that regard, the vertices 1201–1205 of the exemplary section are connected in sequences by line segments 1207–1210.

The vertices of the element selection perimeter can be used to define a vertex area contribution. This process was discussed above, for example with respect to process 404 of FIG. 5. In this regard, a vertex area contribution 1206 can be defined using three sequential vertices 1202–1204 of the exemplary element selection perimeter section 1200. As shown in FIG. 12, the vertex area contribution 1206 can be defined by connecting the three sequential vertices 1202–1204 with three line segments 1208, 1209, 1211. The second vertex 1203 in the sequence of vertices 1202–1204 defining the vertex area contribution 1206 is typically designated as the corresponding vertex 1203 of the vertex area contribution 1206, as was discussed above for example with respect to FIG. 4A.

As discussed above, for example with respect to the process 408 in FIG. 6A, the ESM 204 can redefine the element selection perimeter without a corresponding vertex. In that regard, if the vertex area contribution 1206 is determined to meet the condition (e.g., less than $A_{min}$), the ESM 204 can redefine the element selection perimeter without the corresponding vertex 1203. In that case, the element selection perimeter would be defined by the line segment 1211 between the two remaining vertices 1202, 1204.

With regard to the following discussion of FIGS. 13A–15B, elements that are marked with an "X" are rejected from consideration for selection. Further, elements that are marked with a "check-mark" have been selected. Elements that are marked with two "check-marks" were selected during a previous process. Finally, elements that have been rejected or that were not selected are omitted from the subsequent figure to facilitate the description of the examples.

Figure 13A:
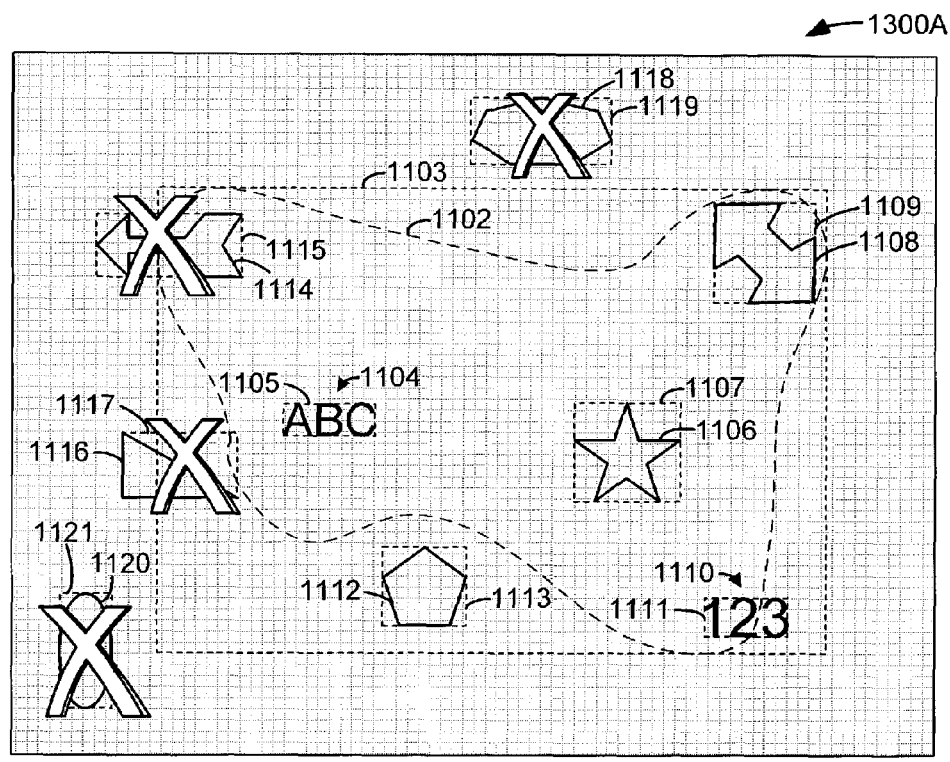
FIG. 13A illustrates an exemplary document with elements that have been processed for full containment within the element selection perimeter in accordance with the logic flow diagram illustrated in FIG. 7 according to an exemplary embodiment of the present invention.

FIG. 13A illustrates an exemplary document 1300A with elements that have been processed for full containment within the element selection perimeter in accordance with the logic flow diagram illustrated in FIG. 7. As discussed above with respect to the process 304A of FIG. 7 for full containment mode, the ESM 204 rejects every element with a bounding box that is entirely outside of the element selection perimeter bounding box 1103 and then rejects every element with a bounding box that is not fully inside of the element selection perimeter bounding box 1103. Thus, the oval 1120 is rejected in the document 1300A, for example, in accordance with step 708 because its bounding box 1121 is entirely outside of the element selection perimeter bounding box 1103. As another example, the arrow 1114 is rejected in the document 1300A in accordance with step 712 because its bounding box 1115 is not fully inside of the element selection perimeter bounding box 1103. As shown in FIG. 13A, other elements are rejected according to the process 304A with a selection mode of full containment.

Figure 13B:
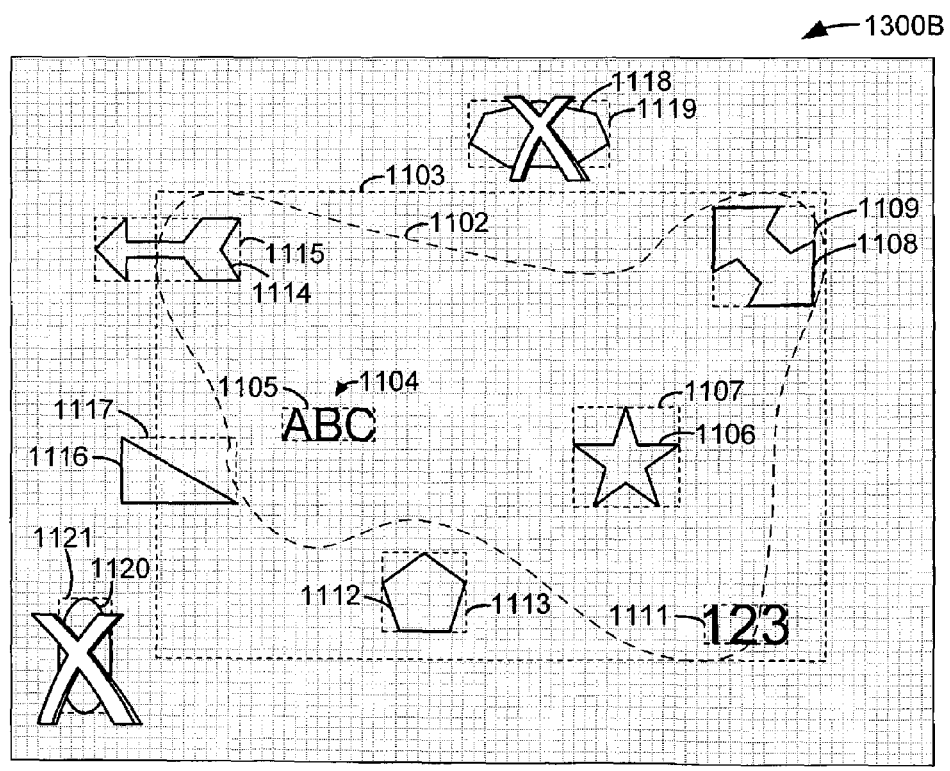
FIG. 13B illustrates an exemplary document with elements that have been processed for partial containment within the element selection perimeter in accordance with the logic flow diagram illustrated in FIG. 7 according to an exemplary embodiment of the present invention.

FIG. 13B illustrates an exemplary document 1300B with elements that have been processed for partial containment within the element selection perimeter in accordance with the logic flow diagram illustrated in FIG. 7. As discussed above with respect to the process 304A of FIG. 7 for partial containment mode, the ESM 204 rejects every element with a bounding box that is entirely outside of the element selection perimeter bounding box 1103. Therefore, the oval 1120 is rejected, for example, in accordance with step 708 because its bounding box 1121 is entirely outside of the element selection perimeter bounding box 1103. As shown in FIG. 13B, other elements are rejected according to the process 304A with a selection mode of partial containment.

Figure 14A:
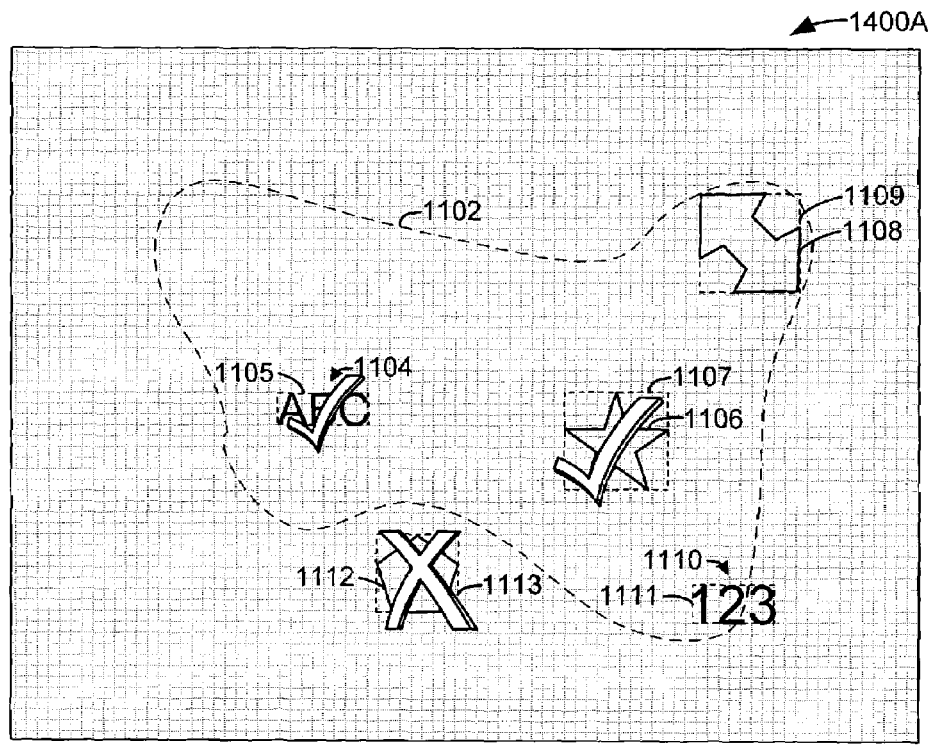
FIG. 14A illustrates an exemplary document with elements that have been processed for full containment within the element selection perimeter in accordance with the logic flow diagram illustrated in FIG. 8 according to an exemplary embodiment of the present invention.

FIG. 14A illustrates an exemplary document 1400A with elements that have been processed for full containment within the element selection perimeter in accordance with the logic flow diagram illustrated in FIG. 8. In that regard, FIG. 14A is a continued example of the processing of the document 1300A of FIG. 13A, and elements that were rejected in FIG. 13A are not shown in FIG. 14A to facilitate the example. As discussed above with respect to the process 304B of FIG. 8, the ESM 204 rejects every element with a bounding box that is entirely outside of the element selection perimeter 1102 and selects every element with a bounding box that is entirely inside of the element selection perimeter 1102. Thus, the pentagon 1112 is rejected in the document 1400A, for example, in accordance with step 802 because its bounding box 1113 is entirely outside of the element selection perimeter 1102. Furthermore, the letter phrase 1105 is selected in the document 1400A, for example, in accordance with step 804 because its bounding box 1105 is entirely inside of the element selection perimeter 1102. As shown in FIG. 14A, other elements are rejected and selected according to the process 304B.

Figure 14B:
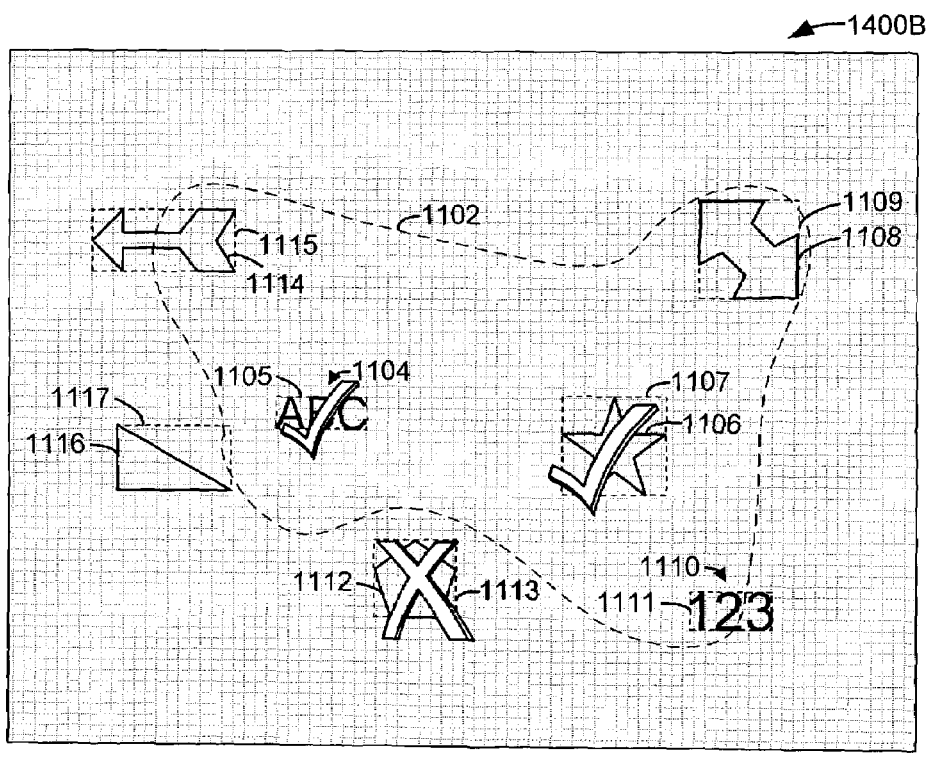
FIG. 14B illustrates an exemplary document with elements that have been processed for partial containment within the element selection perimeter in accordance with the logic flow diagram illustrated in FIG. 8 according to an exemplary embodiment of the present invention.

FIG. 14B illustrates an exemplary document 1400B with elements that have been processed for partial containment within the element selection perimeter in accordance with the logic flow diagram illustrated in FIG. 8. In that regard, FIG. 14B is a continued example of the processing of the document 1300A of FIG. 13B. As discussed above with respect to the process 304B of FIG. 8, the ESM 204 rejects every element with a bounding box that is entirely outside of the element selection perimeter 1102 and selects every element with a bounding box that is entirely inside of the element selection perimeter 1102. Therefore, the pentagon 1112 is rejected in the document 1400B, for example, in accordance with step 802 because its bounding box 1113 is entirely outside of the element selection perimeter 1102. Moreover, the letter phrase 1105 is selected in the document 1400B, for example, in accordance with step 804 because its bounding box 1105 is entirely inside of the element selection perimeter 1102. As shown in FIG. 14B, other elements are rejected and selected according to the process 304B.

Figure 15A:
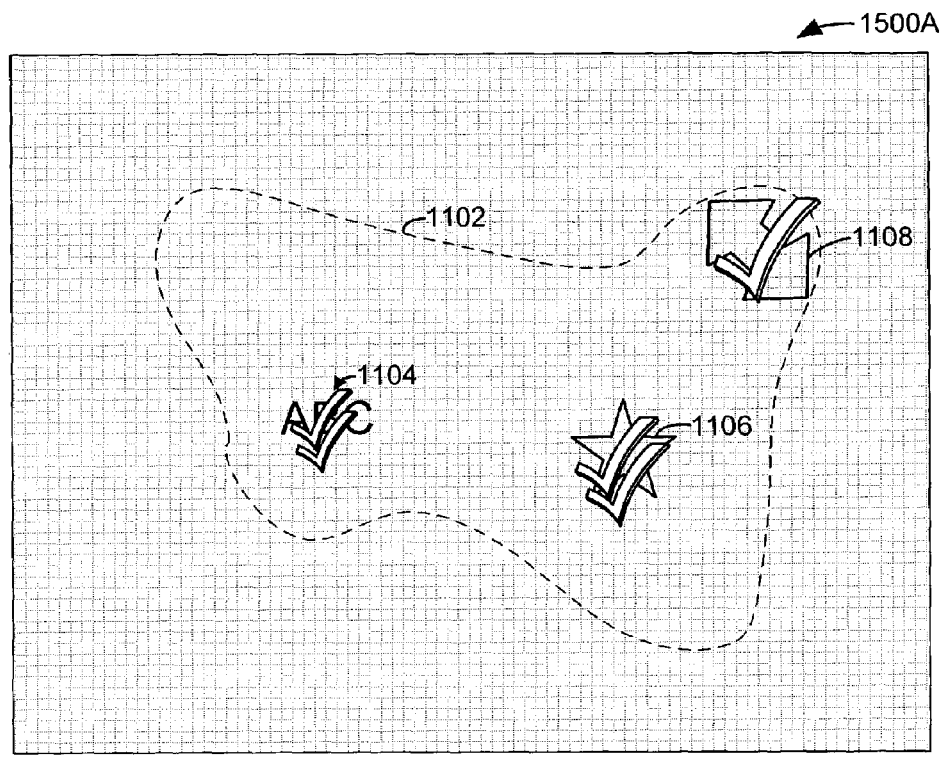
FIG. 15A illustrates an exemplary document with elements that have been processed for full containment within the element selection perimeter in accordance with the logic flow diagram illustrated in FIG. 9 according to an exemplary embodiment of the present invention.

FIG. 15A illustrates an exemplary document 1500A with elements that have been processed for full containment within the element selection perimeter in accordance with the logic flow diagram illustrated in FIG. 9. In that regard, FIG. 15A is a continued example of the processing of the document 1400A of FIG. 14A. As discussed above with respect to the process 304C of FIG. 9 for full containment mode, the ESM 204 selects every element that is fully contained within the element selection perimeter. Considering the rejections and selections of elements made during the previous processing of the document 1500A, there are no elements to be selected, and the letter phrase 1104 and the star 1106 remain selected from the process 304B.

Figure 15B:
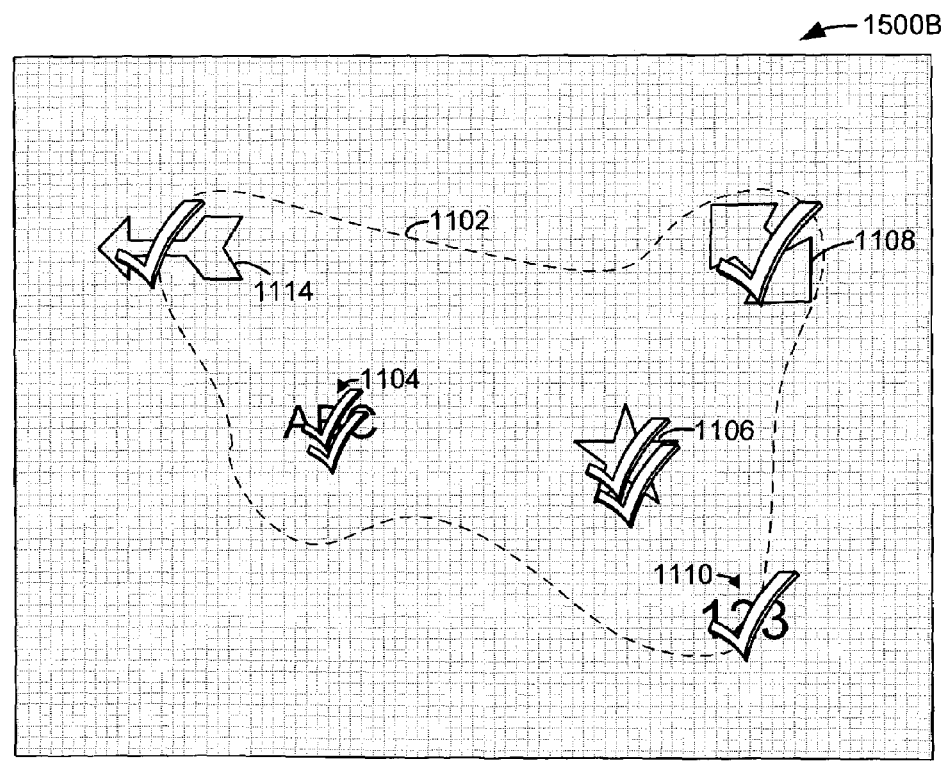
FIG. 15B illustrates an exemplary document with elements that have been processed for partial containment within the element selection perimeter in accordance with the logic flow diagram illustrated in FIG. 9 according to an exemplary embodiment of the present invention.

FIG. 15B illustrates an exemplary document 1500B with elements that have been processed for partial containment within the element selection perimeter in accordance with the logic flow diagram illustrated in FIG. 9. In that regard, FIG. 15B is a continued example of the processing of the document 1400B of FIG. 14B. As discussed above with respect to the process 304C of FIG. 9, for partial containment mode, the ESM 204 selects every element that is at least partially contained within the element selection perimeter. Considering the rejections and selections of elements made during the previous processing of the document 1500B, the letter phrase 1104 and the star 1106 remain selected from the process 304B. Moreover, the double arrow 1108, the number phrase 1110, and the arrow 1114 are selected since these elements are at least partially contained within the element selection perimeter 1102.

In conclusion, the present invention enables users to select elements in a GUI quickly, with minimal processor computations, using an element selection perimeter or "lasso." The present invention facilitates simple, fast element selection computations by minimizing the number of points (or vertices) defining an element selection perimeter. The present invention also performs preliminary selections and rejections of elements that are located inside or outside of an element selection perimeter, respectively, thereby reducing the amount of element selection computations needed to determine element selections. These features of the present invention can provide element selection in a GUI that is fast and requires a minimized amount of computations.

It will be appreciated that the present invention fulfills the needs of the prior art described herein and meets the above-stated objects. While there has been shown and described several exemplary embodiments of the present invention, it will be evident to those skilled in the art that various modifications and changes may be made thereto without departing from the spirit and the scope of the present invention as set forth in the appended claims and equivalence thereof. For instance, various aspects of the present invention can be applied to element selection by various other methods in various other application programs.

What is claimed is:

1. A method for element selection in a graphical user interface comprising:
   creating an element selection perimeter comprising a plurality of points;
   simplifying the element selection perimeter by a process comprising:
      reading the points that define the element selection perimeter;
      determining the area contributions of the points;
      determining if any of the area contributions of the points are less than a predetermined area value;
      redefining the element selection perimeter without the point that corresponds to an area contribution that is less than the predetermined area value;
      determining the number of remaining points; and
      redefining the element selection perimeter without the point that has the smallest area contribution if the number of points is greater than a predetermined point quantity value; and
   determining which elements are selected with the element selection perimeter.

2. The method of claim 1, wherein simplifying the element selection perimeter comprises:
   reading the points that define the element selection perimeter;
   determining the area contributions of the points;
   determining if any of the area contributions of the points are less than a predetermined area value;
   redefining the element selection perimeter without the point that corresponds to an are a contribution that is less than the predetermined area value;
   determining the number of remaining points; and
   increasing the predetermined area value by a predetermined increment if the number of points is greater than a predetermined point quantity value.

3. The method of claim 1, wherein determining the area contributions of the points comprises:
   selecting three sequential points on the element selection perimeter;
   defining a triangular perimeter using the three sequential points; and
   calculating the area bounded by the triangular perimeter.

4. The method of claim 2, wherein determining the area contributions of the points comprises:
   selecting three sequential points on the element selection perimeter;
   defining a triangular perimeter using the three sequential points; and
   calculating the area bounded by the triangular perimeter.

5. The method of claim 1, wherein redefining the element selection perimeter without the point that corresponds to an area contribution that is less than the predetermined area value comprises:
   selecting a triangular perimeter, defined by three sequential points, that bounds the area contribution that is less than the predetermined area value;
   deleting the second point of the three sequential points that define the triangular perimeter;
   redefining the section of the element selection perimeter between the two remaining points; and
   determining the new area contributions of the two remaining points.

6. The method of claim 2, wherein redefining the element selection perimeter without the point that corresponds to an area contribution that is less than the predetermined area value comprises:
   selecting a triangular perimeter, defined by three sequential points, that bounds the area contribution that is less than the predetermined area value;
   deleting the second point of the three sequential points that define the triangular perimeter;
   redefining the section of the element selection perimeter between the two remaining points; and
   determining the new area contributions of the two remaining points.

7. The method of claim 1, wherein redefining the element selection perimeter without the point that has the smallest area contribution if the number of points is greater than a predetermined point quantity value comprises:
   selecting a triangular perimeter, defined by three sequential points, that bounds the smallest area contribution;
   deleting the second point of the three sequential points that define the triangular perimeter;
   redefining the section of the element selection perimeter between the two remaining points; and
   determining the new area contributions of the two remaining points.

8. The method of claim 5, wherein determining the new area contributions of the two remaining points comprises:
   selecting a remaining point;

selecting the point immediately in sequence before the remaining point;
selecting the point immediately in sequence after the remaining point;
defining a triangular perimeter using the remaining point and the points immediately before and after the remaining point; and
calculating the area bounded by the triangular perimeter defined using the remaining point and the points immediately before and after the remaining point.

9. The method of claim 6, wherein determining the new area contributions of the two remaining points comprises:
selecting a remaining point;
selecting the point immediately in sequence before the remaining point;
selecting the point immediately in sequence after the remaining point;
defining a triangular perimeter using the remaining point and the points immediately before and after the remaining point; and
calculating the area bounded by the triangular perimeter defined using the remaining point and the points immediately before and after the remaining point.

10. The method of claim 7, wherein determining the new area contributions of the two remaining points comprises:
selecting a remaining point;
selecting the point immediately in sequence before the remaining point;
selecting the point immediately in sequence after the remaining point;
defining a triangular perimeter using the remaining point and the points immediately before and after the remaining point; and
calculating the area bounded by the triangular perimeter defined using the remaining point and the points immediately before and after the remaining point.

11. The method of claim 1, wherein determining which elements are selected comprises:
determining if the element intersects the element selection perimeter;
if the element intersects the element selection perimeter, concluding that the element is partially contained inside the element selection perimeter;
if the element does not intersect the element selection perimeter, determining if the element is entirely outside of the element selection perimeter;
if the element is entirely outside of the element selection perimeter, concluding that the element is not contained inside the element selection perimeter; and
if the element is not entirely outside of the element selection perimeter, concluding that the element is fully contained inside the element selection perimeter.

12. The method of claim 11, wherein determining if the element intersects the element selection perimeter comprises:
dividing the element into discrete curves;
determining if any discrete curve of the element intersects the element selection perimeter; and
determining that the element is partially contained inside the element selection perimeter, if any discrete curve of the element intersects the element selection perimeter.

13. The method of claim 11, wherein determining if the element is entirely outside of the element selection perimeter comprises:
dividing the element into discrete curves;
determining if any discrete curve of the element is entirely outside of the element selection perimeter;
determining that the element is not contained inside the element selection perimeter, if every discrete curve of the element is entirely outside of the element selection perimeter; and
determining that the element is fully contained inside the element selection perimeter, if every discrete curve of the element is not entirely outside of the element selection perimeter.

14. A computer system for element selection in a graphical user interface, comprising:
a processing unit;
a memory in communication with the processing unit;
a display device in communication with the processing unit for displaying elements; and
a program stored in the memory for providing instructions to the processing unit, the processing unit responsive to the instructions of the program, operable for:
simplifying an element selection perimeter by:
reading the points that define the element selection perimeter;
determining the area contributions of the points;
determining if any of the area contributions of the points are less than a predetermined area value;
redefining the element selection perimeter without the point that corresponds to an area contribution that is less than the predetermined area value; determining the number of remaining points; and
redefining the element selection perimeter without the point that has the smallest area contribution if the number of points is greater than a predetermined point quantity value; and
determining which elements are selected.

15. The computer system of claim 14, wherein the processing unit is operable for simplifying the element selection perimeter by:
reading the points that define the element selection perimeter;
determining the area contributions of the points;
determining if any of the area contributions of the points are less than a predetermined area value;
redefining the element selection perimeter without the point that corresponds to an area contribution that is less than the predetermined area value; determining the number of remaining points; and
increasing the predetermined area value by a predetermined increment if the number of points is greater than a predetermined point quantity value.

16. The computer system of claim 14, wherein the processing unit is operable for determining the area contributions of the points by:
selecting three sequential points on the element selection perimeter;
defining a triangular perimeter using the three sequential points; and
calculating the area bounded by the triangular perimeter.

17. The computer system of claim 15, wherein the processing unit is operable for determining the area contributions of the points by:
selecting three sequential points on the element selection perimeter;
defining a triangular perimeter using the three sequential points; and
calculating the area bounded by the triangular perimeter.

18. The computer system of claim 14, wherein the processing unit is operable for redefining the element selection perimeter without the point that corresponds to an area contribution that is less than the predetermined area value by:
- selecting a triangular perimeter, defined by three sequential points, that bounds the area contribution that is less than the predetermined area value;
- deleting the second point of the three sequential points that define the triangular perimeter;
- redefining the section of the element selection perimeter between the two remaining points; and
- determining the new area contributions of the two remaining points.

19. The computer system of claim 15, wherein the processing unit is operable for redefining the element selection perimeter without the point that corresponds to an area contribution that is less than the predetermined area value by:
- selecting a triangular perimeter, defined by three sequential points, that bounds the area contribution that is less than the predetermined area value;
- deleting the second point of the three sequential points that define the triangular perimeter;
- redefining the section of the element selection perimeter between the two remaining points; and
- determining the new area contributions of the two remaining points.

20. The computer system of claim 14, wherein the processing unit is operable for redefining the element selection perimeter without the point that has the smallest area contribution if the number of points is greater than a predetermined point quantity value by:
- selecting a triangular perimeter, defined by three sequential points, that bounds the smallest area contribution;
- deleting the second point of the three sequential points that define the triangular perimeter;
- redefining the section of the element selection perimeter between the two remaining points; and
- determining the new area contributions of the two remaining points.

21. The computer system of claim 18, wherein the processing unit is operable for determining the new area contributions of the two remaining points by:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

22. The computer system of claim 19, wherein the processing unit is operable for determining the new area contributions of the two remaining points by:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

23. The computer system of claim 20, wherein the processing unit is operable for determining the new area contributions of the two remaining points by:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

24. A computer-implemented method for selecting elements displayed by a computing device, comprising:
- creating an element selection perimeter comprising a plurality of points;
- reading the points that define the element selection perimeter;
- determining the area contributions of the points;
- determining if any of the area contributions of the points are less than a predetermined area value;
- redefining the element selection perimeter without the point that corresponds to an area contribution that is less than the predetermined area value;
- determining the number of remaining points;
- redefining the element selection perimeter without the point that has the smallest area contribution if the number of points is greater than a predetermined point quantity value; and
- determining which elements are selected with the element selection perimeter.

25. The computer-implemented method of claim 24, wherein creating an element selection perimeter comprises inputting points to a graphical interface from an input device using an element selection tool.

26. The computer-implemented method of claim 24, wherein creating an element selection perimeter comprises arranging points in a graphical interface that correspond to the perimeter of an element.

27. The computer-implemented method of claim 24, wherein determining the area contributions of the points comprises:
- selecting three sequential points on the element selection perimeter;
- defining a triangular perimeter using the three sequential points; and
- calculating the area bounded by the triangular perimeter.

28. The computer-implemented method of claim 24, wherein redefining the element selection perimeter without the point that corresponds to an area contribution that is less than the predetermined area value comprises:
- selecting a triangular perimeter, defined by three sequential points, that bounds the area contribution that is less than the predetermined area value;
- deleting the second point of the three sequential points that define the triangular perimeter;
- redefining the section of the element selection perimeter between the two remaining points; and
- determining the new area contributions of the two remaining points.

29. The computer-implemented method of claim 24, wherein redefining the element selection perimeter without the point that has the smallest area contribution if the number of points is greater than a predetermined point quantity value comprises:

selecting a triangular perimeter, defined by three sequential points, that bounds the smallest area contribution;
deleting the second point of the three sequential points that define the triangular perimeter;
redefining the section of the element selection perimeter between the two remaining points; and
determining the new area contributions of the two remaining points.

30. The computer-implemented method of claim 28, wherein determining the new area contributions of the two remaining points comprises:
selecting a remaining point;
selecting the point immediately in sequence before the remaining point;
selecting the point immediately in sequence after the remaining point;
defining a triangular perimeter using the remaining point and the points immediately before and after the remaining point; and
calculating the area bounded by the triangular perimeter defined using the remaining point and the points immediately before and after the remaining point.

31. The computer-implemented method of claim 24, wherein determining the new area contributions of the two remaining points comprises:
selecting a remaining point;
selecting the point immediately in sequence before the remaining point;
selecting the point immediately in sequence after the remaining point;
defining a triangular perimeter using the remaining point and the points immediately before and after the remaining point; and
calculating the area bounded by the triangular perimeter defined using the remaining point and the points immediately before and after the remaining point.

32. The computer-implemented method of claim 24, wherein determining which elements are selected comprises:
rejecting every element from consideration for selection that is unselectable;
defining a bounding box around the element selection perimeter;
defining a bounding box around each element;
rejecting every element from consideration for selection that has a bounding box that is entirely outside of the bounding box of the element selection perimeter;
determining the selection mode;
rejecting every element from consideration for selection that has a bounding box that is not entirely inside the bounding box of the element selection perimeter if the selection mode is full containment; and
determining if there are any elements remaining that have a bounding box that is at least partially inside of the bounding box of the element selection perimeter.

33. The computer-implemented method of claim 24, further comprising:
rejecting every element from consideration for selection that has a bounding box that is entirely outside of the element selection perimeter;
selecting every element that has a bounding box that is entirely inside of the element selection perimeter; and
determining if there are any elements remaining that have a bounding box that is at least partially inside of the element selection perimeter.

34. The computer-implemented method of claim 33, further comprising:

determining the selection mode;
selecting every element that is entirely inside of the element selection perimeter if the selection mode is full containment; and
selecting every element that is at least partially inside of the element selection perimeter if the selection mode is partial containment.

35. A computer-readable medium having computer-executable instructions for performing steps comprising:
creating an element selection perimeter comprising a plurality of points;
simplifying the element selection perimeter by a process comprising:
reading the points that define the element selection perimeter;
determining the area contributions of the points;
determining if any of the area contributions of the points are less than a predetermined area value;
redefining the element selection perimeter without the point that corresponds to an area contribution that is less than the predetermined area value;
determining the number of remaining points; and
redefining the element selection perimeter without the point that has the smallest area contribution if the number of points is greater than a predetermined point quantity value; and
determining which elements are selected with the element selection perimeter.

36. The computer-readable medium of claim 35, wherein simplifying the element selection perimeter comprises:
reading the points that define the element selection perimeter;
determining the area contributions of the points;
determining if any of the area contributions of the points are less than a predetermined area value;
redefining the element selection perimeter without the point that corresponds to an area contribution that is less than the predetermined area value;
determining the number of remaining points; and
increasing the predetermined area value by a predetermined increment if the number of points is greater than a predetermined point quantity value.

37. The computer-readable medium of claim 35, wherein determining the area contributions of the points comprises:
selecting three sequential points on the element selection perimeter;
defining a triangular perimeter using the three sequential points; and
calculating the area bounded by the triangular perimeter.

38. The computer-readable medium of claim 36, wherein determining the area contributions of the points comprises:
selecting three sequential points on the element selection perimeter;
defining a triangular perimeter using the three sequential points; and
calculating the area bounded by the triangular perimeter.

39. The computer-readable medium of claim 35, wherein redefining the element selection perimeter without the point that corresponds to an area contribution that is less than the predetermined area value comprises:
selecting a triangular perimeter, defined by three sequential points, that bounds the area contribution that is less than the predetermined area value;
deleting the second point of the three sequential points that define the triangular perimeter;
redefining the section of the element selection perimeter between the two remaining points; and determining the new area contributions of the two remaining points.

40. The computer-readable medium of claim 36, wherein redefining the element selection perimeter without the point that corresponds to an area contribution that is less than the predetermined area value comprises:
- selecting a triangular perimeter, defined by three sequential points, that bounds the area contribution that is less than the predetermined area value;
- deleting the second point of the three sequential points that define the triangular perimeter;
- redefining the section of the element selection perimeter between the two remaining points; and
- determining the new area contributions of the two remaining points.

41. The computer-readable medium of claim 35, wherein redefining the element selection perimeter without the point that has the smallest area contribution if the number of points is greater than a predetermined point quantity value comprises:
- selecting a triangular perimeter, defined by three sequential points, that bounds the smallest area contribution;
- deleting the second point of the three sequential points that define the triangular perimeter;
- redefining the section of the element selection perimeter between the two remaining points; and
- determining the new area contributions of the two remaining points.

42. The computer-readable medium of claim 39, wherein determining the new area contributions of the two remaining points comprises:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

43. The computer-readable medium of claim 40, wherein determining the new area contributions of the two remaining points comprises:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

44. The computer-readable medium of claim 41, wherein determining the new area contributions of the two remaining points comprises:
- selecting a remaining point;
- selecting the point immediately in sequence before the remaining point;
- selecting the point immediately in sequence after the remaining point;
- defining a triangular perimeter using the remaining point and the points immediately before and after the remaining point; and
- calculating the area bounded by the triangular perimeter defined using the remaining point and the points immediately before and after the remaining point.

* * * * *